US012685930B2

(12) United States Patent
Astley et al.

(10) Patent No.: US 12,685,930 B2
(45) Date of Patent: Jul. 21, 2026

(54) SYSTEMS AND METHODS FOR EFFICIENT CONTENT MANAGEMENT AND DISTRIBUTION FOR VIDEO GAME DEVELOPMENT

(71) Applicant: Activision Publishing, Inc., Santa Monica, CA (US)

(72) Inventors: Adrian Astley, Portland, ME (US); Sean Houghton, Los Angeles, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 377 days.

(21) Appl. No.: 18/466,156

(22) Filed: Sep. 13, 2023

(65) Prior Publication Data

US 2024/0082706 A1 Mar. 14, 2024

Related U.S. Application Data

(60) Provisional application No. 63/375,433, filed on Sep. 13, 2022.

(51) Int. Cl.
*A63F 13/352* (2014.01)
*G06F 16/16* (2019.01)
*G06F 16/174* (2019.01)

(52) U.S. Cl.
CPC .......... *A63F 13/352* (2014.09); *G06F 16/162* (2019.01); *G06F 16/1748* (2019.01); *A63F 2300/513* (2013.01)

(58) Field of Classification Search
CPC ... A63F 13/352; G06F 16/162; G06F 16/1748
See application file for complete search history.

(56) References Cited

U.S. PATENT DOCUMENTS

| | | | |
|---|---|---|---|
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |

(Continued)

FOREIGN PATENT DOCUMENTS

| | | |
|---|---|---|
| AU | 768367 | 3/2004 |
| AU | 2005215048 | 10/2011 |

(Continued)

*Primary Examiner* — Jay Trent Liddle
(74) *Attorney, Agent, or Firm* — Novel IP

(57) ABSTRACT

Systems and methods for distributing an image file and a plurality of data chunks in a video game development environment include at least one game studio that has a plurality of client computing devices and at least one cache node in data communication with each other over a first network local to the at least one game studio. The plurality of client computing devices are in data communication, through the at least one cache node, with remotely located metadata and object storage servers over a wide area network. The image file includes a manifest of one or more game files and of the plurality of data chunks. The image file is referenced by a hash of data indicative of the image file while each of the plurality of data chunks is referenced by a hash of data indicative of each of the plurality of data chunks.

20 Claims, 14 Drawing Sheets

400a

402a

Upon execution of a GC command, all labels, whose TTL attribute is marked as expired, are automatically deleted 404a All 'images' that are no longer referenced by or associated with any labels, are automatically deleted 406a All chunks that are no longer referenced by or associated with any remaining 'images', are automatically deleted (In embodiments, all chunks are reference counted prior to the step 406a.)

(56)           References Cited

U.S. PATENT DOCUMENTS

| | | | |
|---|---|---|---|
| 5,736,985 | A | 4/1998 | Lection |
| 5,737,416 | A | 4/1998 | Cooper |
| 5,745,678 | A | 4/1998 | Herzberg |
| 5,768,511 | A | 6/1998 | Galvin |
| 5,825,877 | A | 10/1998 | Dan |
| 5,835,692 | A | 11/1998 | Cragun |
| 5,878,233 | A | 3/1999 | Schloss |
| 5,883,628 | A | 3/1999 | Mullaly |
| 5,900,879 | A | 5/1999 | Berry |
| 5,903,266 | A | 5/1999 | Berstis |
| 5,903,271 | A | 5/1999 | Bardon |
| 5,911,045 | A | 6/1999 | Leyba |
| 5,920,325 | A | 7/1999 | Morgan |
| 5,923,324 | A | 7/1999 | Berry |
| 5,969,724 | A | 10/1999 | Berry |
| 5,977,979 | A | 11/1999 | Clough |
| 5,990,888 | A | 11/1999 | Blades |
| 6,014,145 | A | 1/2000 | Bardon |
| 6,025,839 | A | 2/2000 | Schell |
| 6,059,842 | A | 5/2000 | Dumarot |
| 6,069,632 | A | 5/2000 | Mullaly |
| 6,081,270 | A | 6/2000 | Berry |
| 6,081,271 | A | 6/2000 | Bardon |
| 6,091,410 | A | 7/2000 | Lection |
| 6,094,196 | A | 7/2000 | Berry |
| 6,098,056 | A | 8/2000 | Rusnak |
| 6,104,406 | A | 8/2000 | Berry |
| 6,111,581 | A | 8/2000 | Berry |
| 6,134,588 | A | 10/2000 | Guenthner |
| 6,144,381 | A | 11/2000 | Lection |
| 6,148,328 | A | 11/2000 | Cuomo |
| 6,185,614 | B1 | 2/2001 | Cuomo |
| 6,201,881 | B1 | 3/2001 | Masuda |
| 6,222,551 | B1 | 4/2001 | Schneider |
| 6,271,842 | B1 | 8/2001 | Bardon |
| 6,271,843 | B1 | 8/2001 | Lection |
| 6,282,547 | B1 | 8/2001 | Hirsch |
| 6,311,206 | B1 | 10/2001 | Malkin |
| 6,334,141 | B1 | 12/2001 | Varma |
| 6,336,134 | B1 | 1/2002 | Varma |
| 6,337,700 | B1 | 1/2002 | Kinoe |
| 6,353,449 | B1 | 3/2002 | Gregg |
| 6,356,297 | B1 | 3/2002 | Cheng |
| 6,411,312 | B1 | 6/2002 | Sheppard |
| 6,426,757 | B1 | 7/2002 | Smith |
| 6,445,389 | B1 | 9/2002 | Bossen |
| 6,452,593 | B1 | 9/2002 | Challener |
| 6,462,760 | B1 | 10/2002 | Cox, Jr. |
| 6,469,712 | B1 | 10/2002 | Hilpert, Jr. |
| 6,473,085 | B1 | 10/2002 | Brock |
| 6,499,053 | B1 | 12/2002 | Marquette |
| 6,505,208 | B1 | 1/2003 | Kanevsky |
| 6,525,731 | B1 | 2/2003 | Suits |
| 6,549,933 | B1 | 4/2003 | Barrett |
| 6,567,109 | B1 | 5/2003 | Todd |
| 6,618,751 | B1 | 9/2003 | Challenger |
| RE38,375 | E | 12/2003 | Herzberg |
| 6,657,617 | B2 | 12/2003 | Paolini |
| 6,657,642 | B1 | 12/2003 | Bardon |
| 6,684,255 | B1 | 1/2004 | Martin |
| 6,717,600 | B2 | 4/2004 | Dutta |
| 6,734,884 | B1 | 5/2004 | Berry |
| 6,765,596 | B2 | 7/2004 | Lection |
| 6,781,607 | B1 | 8/2004 | Benham |
| 6,819,669 | B2 | 11/2004 | Rooney |
| 6,832,239 | B1 | 12/2004 | Kraft |
| 6,836,480 | B2 | 12/2004 | Basso |
| 6,886,026 | B1 | 4/2005 | Hanson |
| 6,948,168 | B1 | 9/2005 | Kuprionas |
| RE38,865 | E | 11/2005 | Dumarot |
| 6,993,596 | B2 | 1/2006 | Hinton |
| 7,028,296 | B2 | 4/2006 | Irfan |
| 7,062,533 | B2 | 6/2006 | Brown |
| 7,143,409 | B2 | 11/2006 | Herrero |
| 7,209,137 | B2 | 4/2007 | Brokenshire |
| 7,230,616 | B2 | 6/2007 | Taubin |
| 7,249,123 | B2 | 7/2007 | Elder |
| 7,263,511 | B2 | 8/2007 | Bodin |
| 7,287,053 | B2 | 10/2007 | Bodin |
| 7,305,438 | B2 | 12/2007 | Christensen |
| 7,308,476 | B2 | 12/2007 | Mannaru |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,503,007 | B2 | 3/2009 | Goodman |
| 7,506,264 | B2 | 3/2009 | Polan |
| 7,515,136 | B1 | 4/2009 | Kanevsky |
| 7,525,964 | B2 | 4/2009 | Astley |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,596,596 | B2 | 9/2009 | Chen |
| 7,640,587 | B2 | 12/2009 | Fox |
| 7,667,701 | B2 | 2/2010 | Leah |
| 7,698,656 | B2 | 4/2010 | Srivastava |
| 7,702,784 | B2 | 4/2010 | Berstis |
| 7,714,867 | B2 | 5/2010 | Doi |
| 7,719,532 | B2 | 5/2010 | Schardt |
| 7,719,535 | B2 | 5/2010 | Tadokoro |
| 7,734,691 | B2 | 6/2010 | Creamer |
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,773,087 | B2 | 8/2010 | Fowler |
| 7,774,407 | B2 | 8/2010 | Daly |
| 7,782,318 | B2 | 8/2010 | Shearer |
| 7,792,263 | B2 | 9/2010 | Bruce |
| 7,792,801 | B2 | 9/2010 | Hamilton, II |
| 7,796,128 | B2 | 9/2010 | Radzikowski |
| 7,808,500 | B2 | 10/2010 | Shearer |
| 7,814,152 | B2 | 10/2010 | McGowan |
| 7,827,318 | B2 | 11/2010 | Hinton |
| 7,843,471 | B2 | 11/2010 | Doan |
| 7,844,663 | B2 | 11/2010 | Boutboul |
| 7,847,799 | B2 | 12/2010 | Taubin |
| 7,856,469 | B2 | 12/2010 | Chen |
| 7,873,485 | B2 | 1/2011 | Castelli |
| 7,882,222 | B2 | 2/2011 | Dolbier |
| 7,882,243 | B2 | 2/2011 | Ivory |
| 7,884,819 | B2 | 2/2011 | Kuesel |
| 7,886,045 | B2 | 2/2011 | Bates |
| 7,890,623 | B2 | 2/2011 | Bates |
| 7,893,936 | B2 | 2/2011 | Shearer |
| 7,904,829 | B2 | 3/2011 | Fox |
| 7,921,128 | B2 | 4/2011 | Hamilton, II |
| 7,940,265 | B2 | 5/2011 | Brown |
| 7,945,620 | B2 | 5/2011 | Bou-Ghannam |
| 7,945,802 | B2 | 5/2011 | Hamilton, II |
| 7,970,837 | B2 | 6/2011 | Lyle |
| 7,970,840 | B2 | 6/2011 | Cannon |
| 7,985,138 | B2 | 7/2011 | Acharya |
| 7,990,387 | B2 | 8/2011 | Hamilton, II |
| 7,996,164 | B2 | 8/2011 | Hamilton, II |
| 8,001,161 | B2 | 8/2011 | George |
| 8,004,518 | B2 | 8/2011 | Fowler |
| 8,005,025 | B2 | 8/2011 | Bodin |
| 8,006,182 | B2 | 8/2011 | Bates |
| 8,013,861 | B2 | 9/2011 | Hamilton, II |
| 8,018,453 | B2 | 9/2011 | Fowler |
| 8,018,462 | B2 | 9/2011 | Bhogal |

(56) References Cited

U.S. PATENT DOCUMENTS

| | | | |
|---|---|---|---|
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | Mcvey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | Bruce |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 10,261,944 B1* | 4/2019 | Armangau ............ G06F 16/162 |
| 2009/0113448 A1 | 4/2009 | Smith |
| 2011/0231374 A1* | 9/2011 | Jain ..................... G06F 16/1752 |
| | | 707/E17.005 |
| 2013/0144840 A1* | 6/2013 | Anglin ................ G06F 11/1469 |
| | | 707/640 |
| 2014/0095646 A1* | 4/2014 | Chan ....................... H04L 67/55 |
| | | 709/213 |
| 2014/0344725 A1 | 11/2014 | Bates |
| 2016/0191671 A1 | 6/2016 | Dawson |
| 2017/0127095 A1* | 5/2017 | Park ................. H04N 21/23106 |
| 2023/0305733 A1* | 9/2023 | Nikoloudakis ....... G06F 3/0652 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |

(56)                References Cited

FOREIGN PATENT DOCUMENTS

| | | | |
|---|---|---|---|
| EP | 2076888 | B1 | 7/2015 |
| GB | 2339938 | | 10/2002 |
| GB | 2352154 | | 7/2003 |
| JP | 3033956 | B2 | 4/2000 |
| JP | 3124916 | B2 | 1/2001 |
| JP | 3177221 | B2 | 6/2001 |
| JP | 3199231 | B2 | 8/2001 |
| JP | 3210558 | B2 | 9/2001 |
| JP | 3275935 | | 2/2002 |
| JP | 3361745 | | 1/2003 |
| JP | 3368188 | B2 | 1/2003 |
| JP | 3470955 | B | 9/2003 |
| JP | 3503774 | | 12/2003 |
| JP | 3575598 | | 7/2004 |
| JP | 3579823 | B | 7/2004 |
| JP | 3579154 | B2 | 10/2004 |
| JP | 3701773 | B2 | 10/2005 |
| JP | 3777161 | | 3/2006 |
| JP | 3914430 | B | 2/2007 |
| JP | 3942090 | B | 4/2007 |
| JP | 3962361 | | 5/2007 |
| JP | 4009235 | B | 9/2007 |
| JP | 4225376 | | 12/2008 |
| JP | 4653075 | | 12/2010 |
| JP | 5063698 | B | 8/2012 |
| JP | 5159375 | B2 | 3/2013 |
| JP | 5352200 | B2 | 11/2013 |
| JP | 5734566 | B2 | 6/2015 |
| MY | 117864 | A | 8/2004 |
| SG | 55396 | | 12/1998 |
| WO | 2002073457 | | 9/2002 |
| WO | 20020087156 | | 10/2002 |
| WO | 2004086212 | | 10/2004 |
| WO | 2005079538 | | 9/2005 |
| WO | 2007101785 | | 9/2007 |
| WO | 2008037599 | | 4/2008 |
| WO | 2008074627 | | 6/2008 |
| WO | 2008095767 | | 8/2008 |
| WO | 2009037257 | | 3/2009 |
| WO | 2009104564 | | 8/2009 |
| WO | 2010096738 | A1 | 8/2010 |

* cited by examiner

200

210

Add    207    map1.bin /maps/map1.bin

212 CHUNK    1M map2.bin /maps/map2.bin    204

212 CHUNK    1M map3.bin /maps/map3.bin 207    206

220

```
{
    "Version": 0,
    "Size": 780000000,
    "Env": [],
    "Files": [
        {
            "Path": "/maps/map2.bin",
            "Sha1": "1bb7c068c4e162b0b82c3972c87119a49036d8f0",
            "Size": 248000000,
            "Chunks": [
                {
                    "Sha1": "1bf0a17e0709a295efd8af3b33a5316bd65ddfcf",
                    "Size": 1048576
                },
                {
                    "Sha1": "e68641bba66f6b6dff18af14f1d1c607d8e757f1",
                    "Size": 1048576
                },
                ...
            ]
        },
        ...
    ]
}
```

204    204'    204"    206, 206'    208, 208'    206"    208"

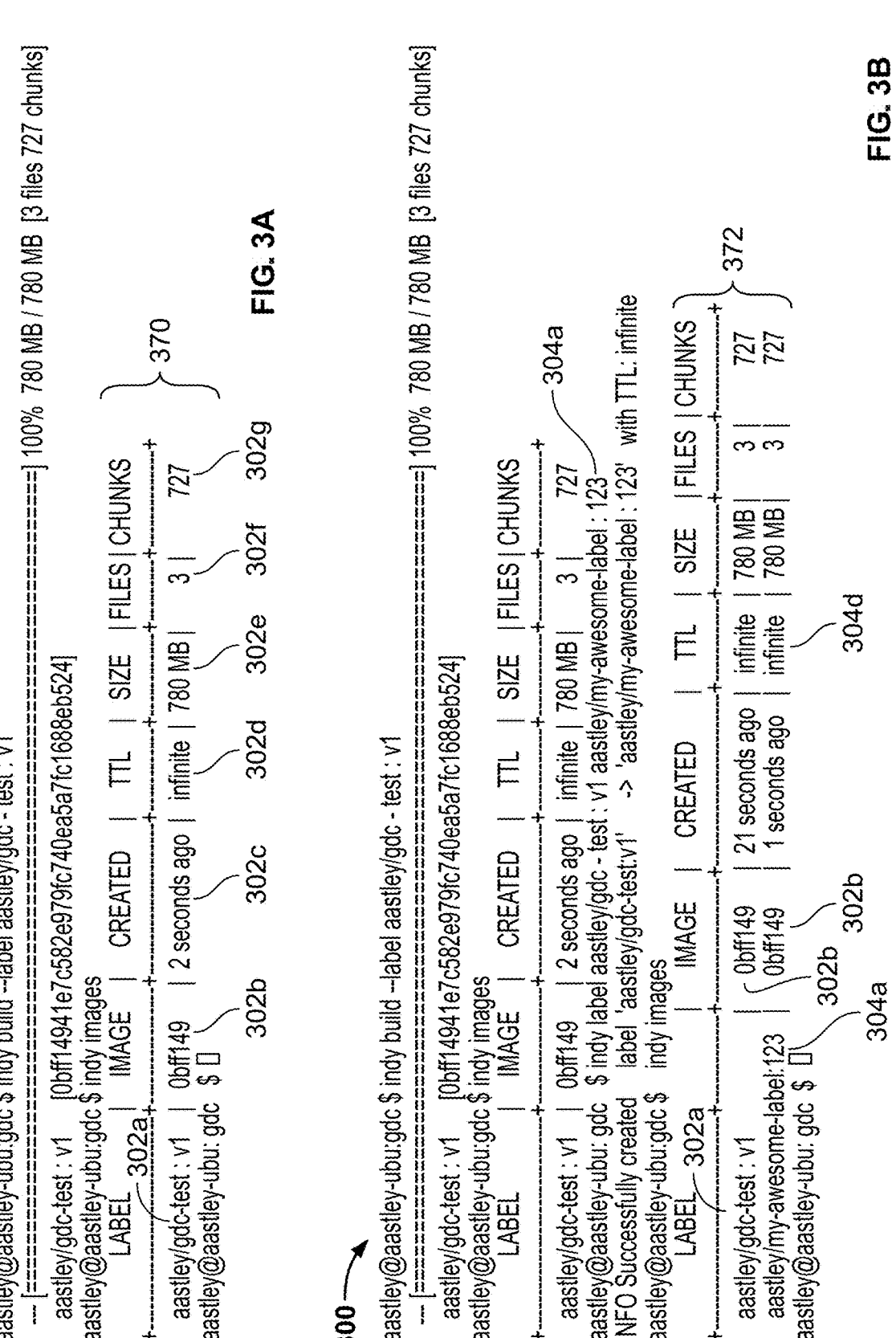

300

```
aastley@aastley-ubu:gdc $ indy build --label aastley/gdc - test : v1
--- [0bff14941e7c582e979fc740ea5a7fc1688eb524] ================================ 100%  780 MB / 780 MB [3 files 727 chunks]
aastley@aastley-ubu:gdc $ indy images
      LABEL      |  IMAGE  |   CREATED     |   TTL    |  SIZE   | FILES | CHUNKS
             302a
aastley/gdc-test : v1 | 0bff149 | 2 seconds ago | infinite | 780 MB |  3  |  727
aastley@aastley-ubu: gdc $ []
     302b         302c        302d           302e       302f    302g
                                                                        370
```

```
aastley@aastley-ubu:gdc $ indy build --label aastley/gdc - test : v1
--- [0bff14941e7c582e979fc740ea5a7fc1688eb524] ================================ 100%  780 MB / 780 MB [3 files 727 chunks]
aastley@aastley-ubu:gdc $ indy images
      LABEL      |  IMAGE  |   CREATED     |   TTL    |  SIZE   | FILES | CHUNKS
             302a
aastley/gdc-test : v1 | 0bff149 | 2 seconds ago | infinite | 780 MB |  3  |  727      304a
aastley@aastley-ubu: gdc $ indy label aastley/gdc - test : v1 aastley/my-awesome-label : 123
INFO Successfully created label 'aastley/gdc-test:v1'  -> 'aastley/my-awesome-label : 123'  with TTL: infinite
aastley@aastley-ubu:gdc $ indy images
      LABEL      |  IMAGE  |   CREATED     |   TTL    |  SIZE   | FILES | CHUNKS
             302a
aastley/gdc-test : v1         | 0bff149 | 21 seconds ago | infinite | 780 MB |  3  |  727
aastley/my-awesome-label:123  | 0bff149 | 1 seconds ago  | infinite | 780 MB |  3  |  727
aastley@aastley-ubu: gdc $ []
     302b                                                                            372
      304a                                                   304d
```

```
aastley/gdc-test : v1    [0bff14941e7c582e979fc740ea5a7fc1688eb524]
aastley@aastley-ubu:gdc $ indy images
    LABEL         |  IMAGE  |  CREATED  |  TTL  |  SIZE  | FILES | CHUNKS
```

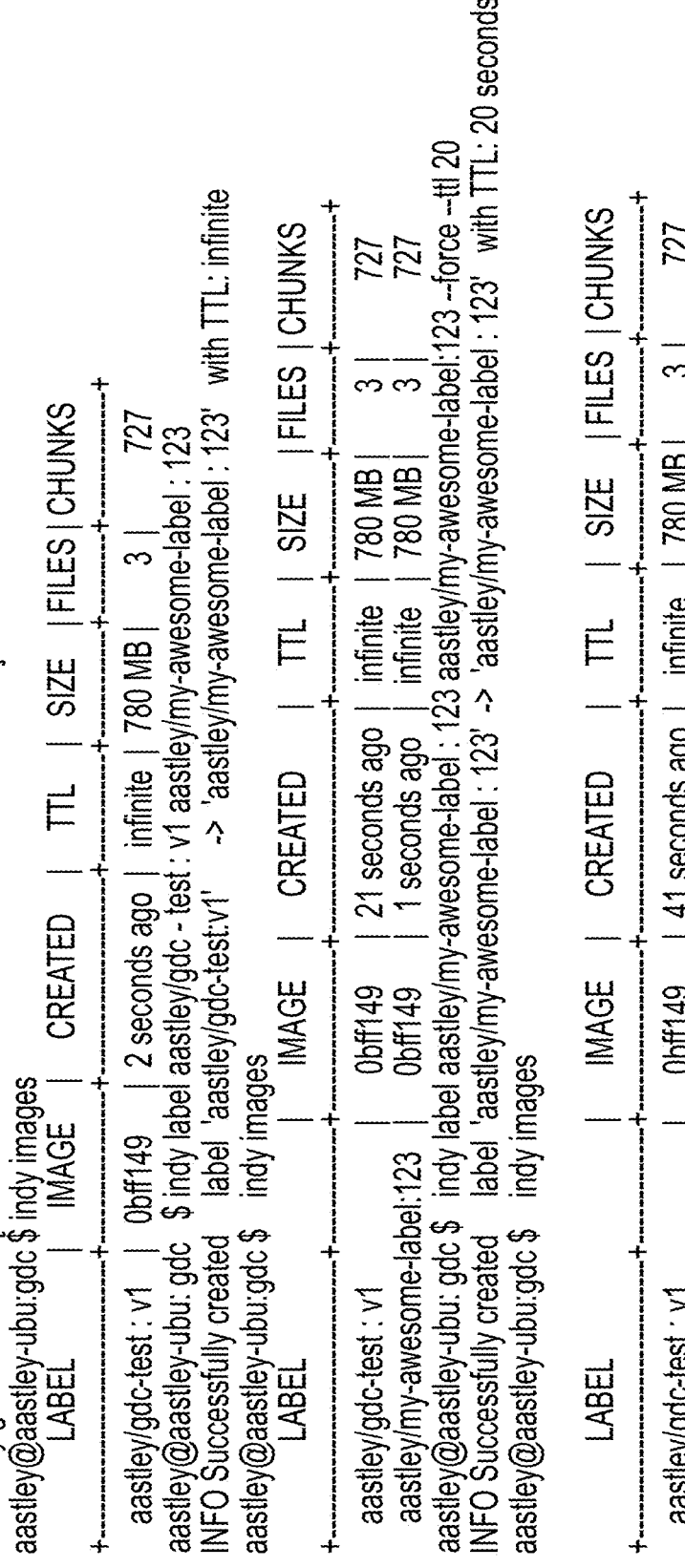

```
aastley/gdc-test : v1   | 0bff149 | 2 seconds ago | infinite | 780 MB | 3 | 727
aastley@aastley-ubu: gdc $ indy label aastley/gdc - test : v1 aastley/my-awesome-label : 123
INFO Successfully created label 'aastley/gdc-test:v1'  -> 'aastley/my-awesome-label : 123'  with TTL: infinite
aastley@aastley-ubu:gdc $ indy images
    LABEL         |  IMAGE  |  CREATED  |  TTL  |  SIZE  | FILES | CHUNKS
```

```
aastley/gdc-test : v1        | 0bff149 | 21 seconds ago | infinite | 780 MB | 3 | 727
aastley/my-awesome-label:123 | 0bff149 | 1 seconds ago  | infinite | 780 MB | 3 | 727
aastley@aastley-ubu: gdc $ indy label aastley/my-awesome-label : 123 aastley/my-awesome-label:123 --force --ttl 20
INFO Successfully created label 'aastley/my-awesome-label : 123'  -> 'aastley/my-awesome-label : 123'  with TTL: 20 seconds
aastley@aastley-ubu:gdc $ indy images
```
304a

```
    LABEL         |  IMAGE  |  CREATED  |  TTL  |  SIZE  | FILES | CHUNKS
```

```
aastley/gdc-test : v1        | 0bff149 | 41 seconds ago | infinite   | 780 MB | 3 | 727
aastley/my-awesome-label:123 | 0bff149 | 1 seconds ago  | 18 seconds | 780 MB | 3 | 727
aastley@aastley-ubu: gdc $ □
```
304d

Figure 3D:
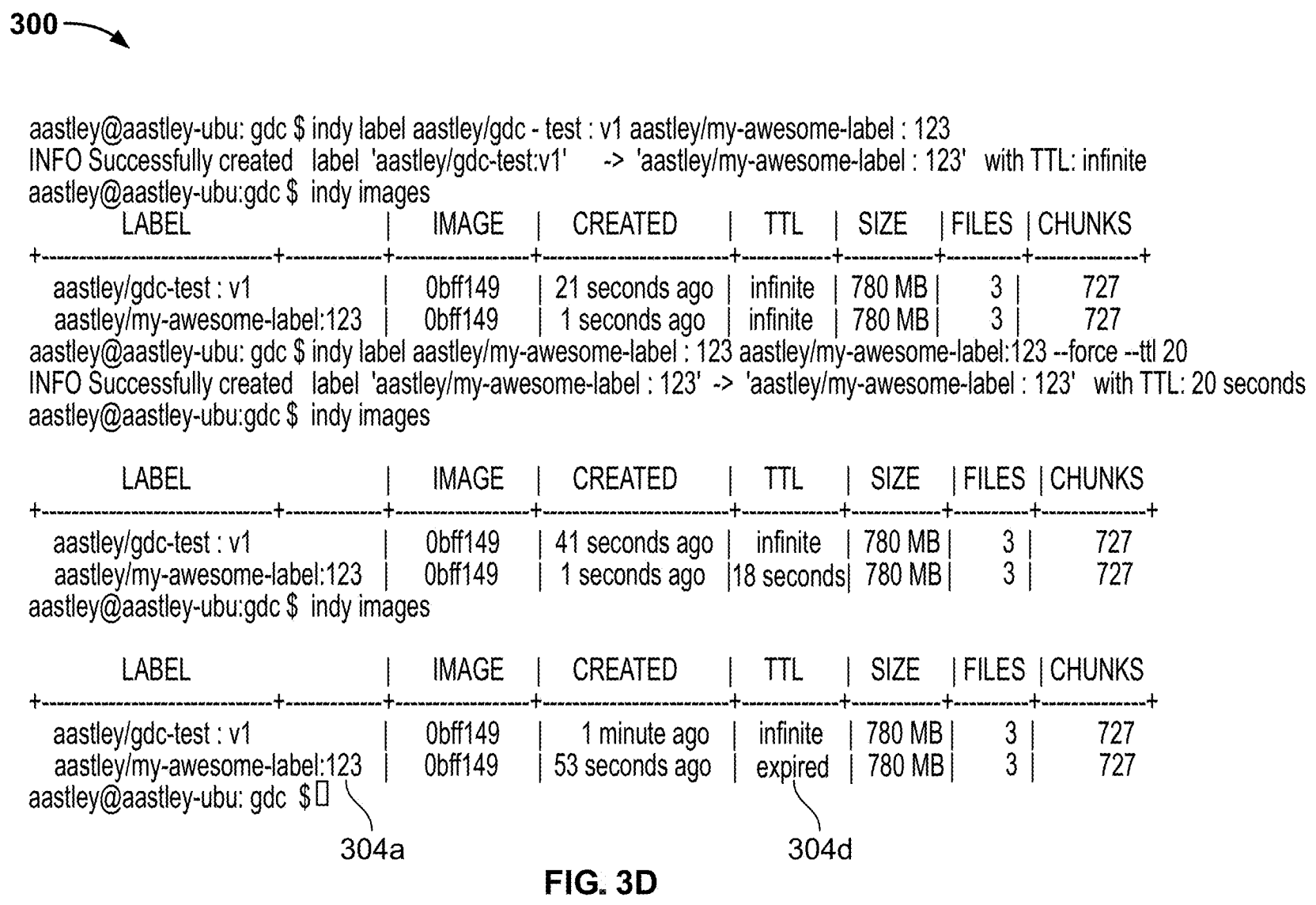

```
aastley@aastley-ubu: gdc $ indy label aastley/gdc - test : v1 aastley/my-awesome-label : 123
INFO Successfully created label 'aastley/gdc-test:v1'   -> 'aastley/my-awesome-label : 123'  with TTL: infinite
aastley@aastley-ubu:gdc $ indy images
```

| LABEL | IMAGE | CREATED | TTL | SIZE | FILES | CHUNKS |
|---|---|---|---|---|---|---|
| aastley/gdc-test : v1 | 0bff149 | 21 seconds ago | infinite | 780 MB | 3 | 727 |
| aastley/my-awesome-label:123 | 0bff149 | 1 seconds ago | infinite | 780 MB | 3 | 727 |

```
aastley@aastley-ubu: gdc $ indy label 'aastley/my-awesome-label : 123 --force --ttl 20
INFO Successfully created label 'aastley/my-awesome-label : 123' -> 'aastley/my-awesome-label : 123'  with TTL: 20 seconds
aastley@aastley-ubu:gdc $ indy images
```

| LABEL | IMAGE | CREATED | TTL | SIZE | FILES | CHUNKS |
|---|---|---|---|---|---|---|
| aastley/gdc-test : v1 | 0bff149 | 41 seconds ago | infinite | 780 MB | 3 | 727 |
| aastley/my-awesome-label:123 | 0bff149 | 1 seconds ago | 18 seconds | 780 MB | 3 | 727 |

| LABEL | IMAGE | CREATED | TTL | SIZE | FILES | CHUNKS |
|---|---|---|---|---|---|---|
| aastley/gdc-test : v1 | 0bff149 | 1 minute ago | infinite | 780 MB | 3 | 727 |
| aastley/my-awesome-label:123 | 0bff149 | 53 seconds ago | expired | 780 MB | 3 | 727 |

```
aastley@aastley-ubu: gdc $□
```

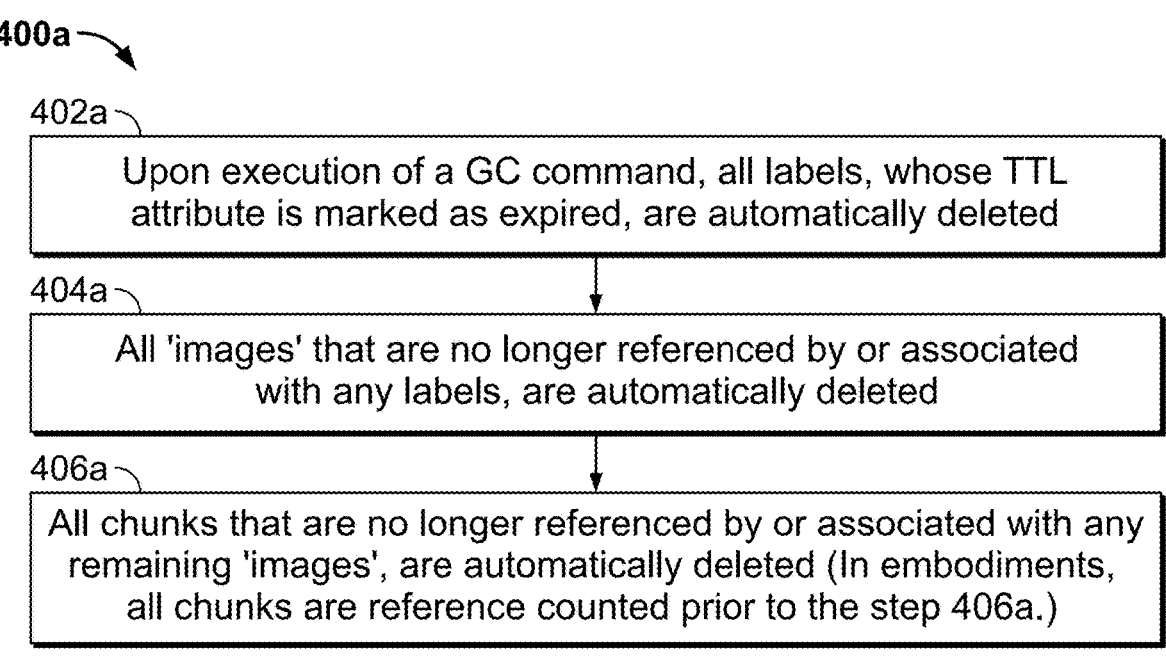

402a

Upon execution of a GC command, all labels, whose TTL attribute is marked as expired, are automatically deleted 404a All 'images' that are no longer referenced by or associated with any labels, are automatically deleted 406a All chunks that are no longer referenced by or associated with any remaining 'images', are automatically deleted (In embodiments, all chunks are reference counted prior to the step 406a.)

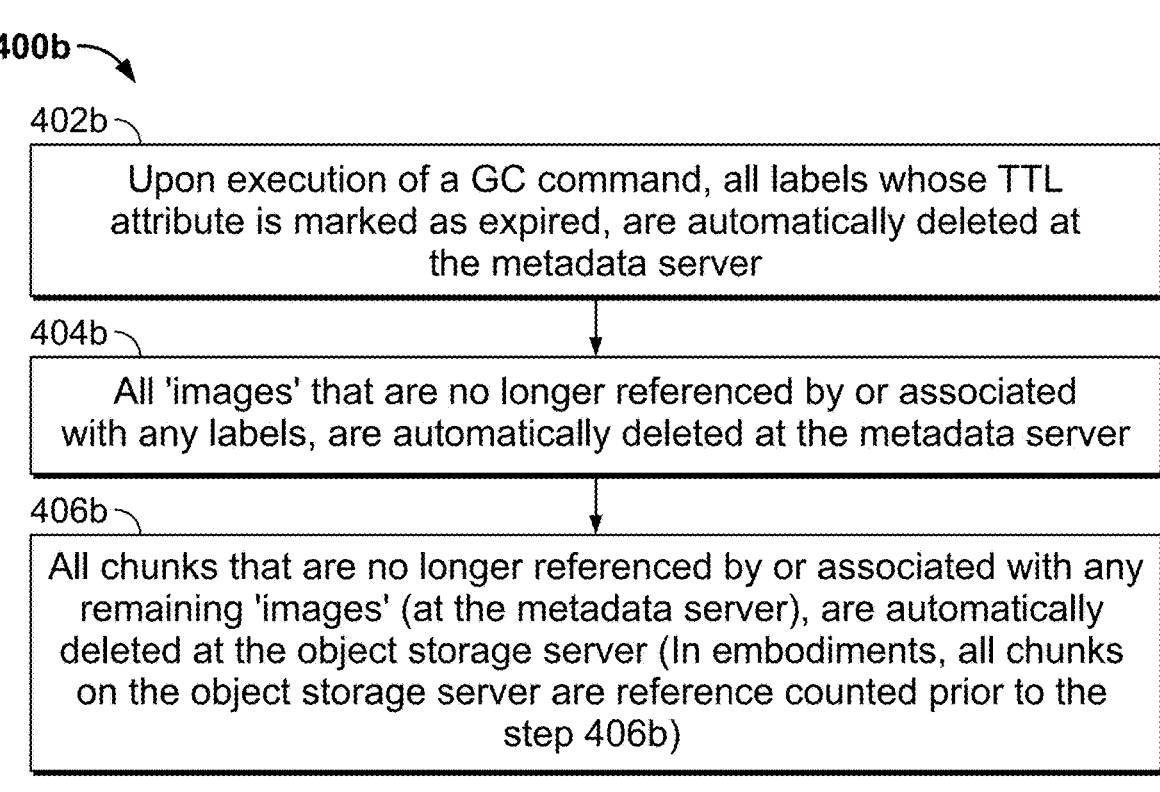

402b

Upon execution of a GC command, all labels whose TTL attribute is marked as expired, are automatically deleted at the metadata server 404b All 'images' that are no longer referenced by or associated with any labels, are automatically deleted at the metadata server 406b All chunks that are no longer referenced by or associated with any remaining 'images' (at the metadata server), are automatically deleted at the object storage server (In embodiments, all chunks on the object storage server are reference counted prior to the step 406b)

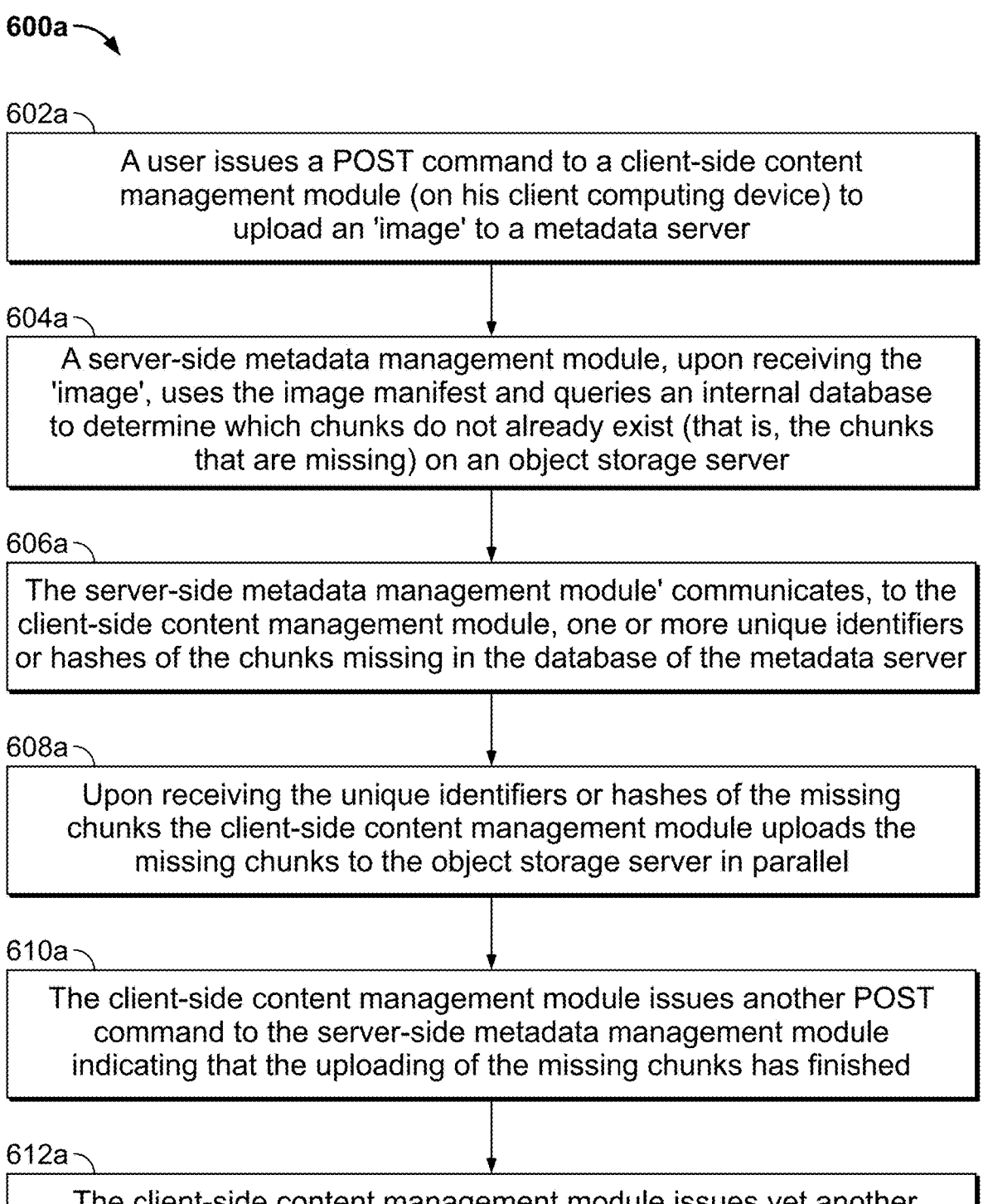

602a

A user issues a POST command to a client-side content management module (on his client computing device) to upload an 'image' to a metadata server 604a A server-side metadata management module, upon receiving the 'image', uses the image manifest and queries an internal database to determine which chunks do not already exist (that is, the chunks that are missing) on an object storage server 606a The server-side metadata management module' communicates, to the client-side content management module, one or more unique identifiers or hashes of the chunks missing in the database of the metadata server 608a Upon receiving the unique identifiers or hashes of the missing chunks the client-side content management module uploads the missing chunks to the object storage server in parallel 610a The client-side content management module issues another POST command to the server-side metadata management module indicating that the uploading of the missing chunks has finished 612a The client-side content management module issues yet another POST command to the server-side metadata management module creating a label association with the 'image'

FIG. 6A

600b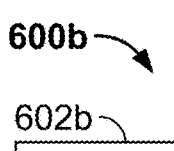

602b

A user through his client-side content management module (on his client computing device) issues a query to a metadata server to receive a unique identifier or hash of an 'image'. The query includes a label associated with the 'image' that the user wants to download.

604b

On receiving the unique identifier or hash the client-side content management module downloads the 'image' (associated with the unique identifier or hash) from the metadata server 606b The client-side content management module determines a list of one or more chunks missing at the user's client computing device by comparing the unique identifiers or hashes of the chunks listed in the received 'image' against the unique identifiers or hashes of one or more chunks already stored locally on the user's client computing device 608b The client-side content management module downloads the one or more missing chunks from the object storage server 610b The client-side content management module updates all data structures (that is, 'images' and chunks) in the user's client computing device

```
FileSysHandle OpenFile( const char *filename, int flags );
size_t Size( FileSysHandle handle );
uint64_t Seek( FileSysHandle handle, const uint64_t pos );
void Close( FileSysHandle handle);
bool Exists( const char *filename );
FileSysResult ReadBlocking( FileSysHandle handle, uint64_t offset, uint64_t size, void *dest,
        uint64_t *numBytesRead );
FileReadHandle StartRead( FileSysHandle handle, uint64_t offset, uint64_t size, void *dest,
        FileReadCallback cbfn, void *cbContext );
```

1000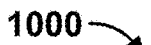

1002

Caching a first file and one or more second files at a first cache node in response to downloading, by a client-side content management module of a user's client computing device, the first and second files from at least one of metadata and object storage servers

1004

The user instructing the client-side content management module to download the first file from the first cache node, wherein the client computing device is in data communication with the cache node over a local area network at a first game studio

1006

Uploading, by the client-side content management module, the first file to a console development kit over a wide area network external to the first game studio, wherein the console development kit is located at a second game studio remote from the first game studio

1008

The user instructing the client-side content management module to execute the first file on the console development kit

1010

Streaming, from a second cache node at the second game studio, one or more portions of the one or more second files to the console development kit during execution of the first file, wherein the streaming is done over local area network at the second game studio

FIG. 10

SYSTEMS AND METHODS FOR EFFICIENT CONTENT MANAGEMENT AND DISTRIBUTION FOR VIDEO GAME DEVELOPMENT

CROSS-REFERENCE

The present specification relies on U.S. Patent Provisional Application No. 63/375,433, titled "Systems and Methods for Efficient Content Management and Distribution for Video Game Development", and filed on Sep. 13, 2022, for priority. The above-mentioned application is herein incorporated by reference in its entirety.

FIELD

The present specification relates generally to video game development. More specifically, the present specification relates to systems and methods for efficient management and distribution of video game content in a large-scale distributed development environment.

BACKGROUND

A large-scale distributed environment for video game development typically includes multiple physical locations of game studios and quality assurance (QA) sites, where each of the multiple geographically dispersed game studios and QA sites operate on a LAN (Local Area Network) while, in turn, the LANs are connected by a WAN (Wide Area Network).

Video game development companies often deploy Continuous Integration (CI) tools, across the distributed game development environment, which are configured to help the geographically dispersed teams to efficiently develop, test, and integrate the game data/files into a shared repository, server or file share multiple times in a day. However, each integration check-in requires the game data/files that are typically quite large in size to be uploaded to and/or downloaded from one or more remote servers over the WAN. With multiple geographically distributed teams performing integration tasks several times a day, the sheer load of game data that must traverse the WAN is exorbitant. For example, for a company having game studios spread out across the US and Australia and QA sites in Europe, if the shared repository, server, or file share is located in California, the latencies to the other studios, over the WAN, may become immense. Thus, with a single file server, teams that are not in the same physical area or network as the file share are guaranteed to have poor performance.

Therefore, there is a need for improved systems and methods that enable geographically dispersed teams to efficiently distribute, share, and integrate game data/files between sites and team members.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a computer-implemented method of performing data cleanup in a game development environment comprising at least one game studio having a plurality of client computing devices and at least one cache node in data communication with each other over a first network local to the at least one game studio, wherein the at least one cache node is in data communication with remotely located first and second servers over a second network external to the game studio, wherein the first and second servers, the at least one cache node as well as each of the plurality of client computing devices store one or more image files, a plurality of data chunks associated with each of the one or more image files and one or more labels referencing each of the one or more image files, and wherein the first server is configured to execute a first module, the second server is configured to execute a second module, the at least one cache node is configured to execute a third module and each of the plurality of client computing devices is configured to execute a fourth module, the method comprising: instructing the first, second, third and fourth modules to cause a respective processor in the first server, the second server, the at least cache node and each of the plurality of client computing devices to: determine at least one first label that has expired; delete the at least one first label; determine at least one first image file that is not referenced by any of the remaining one or more labels; delete the at least one first image file; determine one or more first data chunks that are not associated with any of the remaining one or more image files; and delete the one or more first data chunks.

Optionally, each of the one or more labels has an attribute defining a period of time after which said each of the one or more labels will expire, wherein the attribute is automatically marked as expired at the end of the period of time.

Optionally, each of the one or more labels is an alphanumeric data structure of a form name space/name: tag.

Optionally, more than one of the one or more labels reference an image file of the one or more image files.

Optionally, each of the one or more image files includes a manifest of one or more game files and a plurality of data chunks of each of the one or more game files, wherein each of the one or more game files is referenced by a hash of data indicative of said each of the one or more game files, and wherein each of the plurality of data chunks is referenced by a hash of data indicative of said each of the plurality of data chunks.

Optionally, the first server stores the one or more image files and the second server stores the plurality of data chunks.

Optionally, the instruction is executed automatically on a predefined periodic basis by the first, second, third and fourth modules.

The present specification also discloses a method of distributing an image file and a first plurality of data chunks in a video game development environment comprising at least one game studio that has a plurality of client computing devices and at least one cache node in data communication with each other over a first network local to the at least one game studio, wherein the plurality of client computing devices are in data communication, through the at least one cache node, with remotely located first and second servers over a second network external to the game studio, wherein the image file includes a manifest of one or more game files and of the first plurality of data chunks, and wherein each of the first plurality of data chunks is referenced by a hash of data indicative of said each of the first plurality of data chunks, the method comprising: executing, by a user on a client computing device, a first module; instructing the first module to upload the image file to the first server, wherein the instruction includes a first hash of data indicative of the image file; determining, by a second module at the first server in response to receiving the first hash, which of the first plurality of data chunks are missing from a second plurality of data chunks stored on the second server, wherein the determination is based on comparing the hash of each of the first plurality of data chunks with hashes of the second plurality of data chunks; communicating, by the second module, hashes of the missing data chunks to the first module; and uploading, by the first module, the missing data chunks to the second server.

Optionally, the hashes of the second plurality of data chunks are associated with and listed within each of a plurality of image files stored on the first server.

Optionally, the second server is configured as a webDAV server.

Optionally, the second server is implemented as a distributed cluster of servers. Optionally, a software-defined storage platform is implemented on the distributed cluster of servers. Optionally, the at least one cache node is configured as a RADOS Gateway pod.

Optionally, each of the first and second plurality of data chunks is generated based on a FastCDC algorithm.

The present specification also discloses a method of distributing an image file and a first plurality of data chunks in a video game development environment comprising at least one game studio that has a plurality of client computing devices and at least one cache node in data communication with each other over a first network local to the at least one game studio, wherein the plurality of client computing devices are in data communication, through the at least one cache node, with remotely located first and second servers over a second network external to the game studio, wherein the image file includes a manifest of one or more game files and of the first plurality of data chunks, wherein the image file resides on the first server and the first plurality of data chunks reside on the second server, and wherein the image file is referenced by a first hash of data indicative of the image file and each of the first plurality of data chunks is referenced by a hash of data indicative of said each of the first plurality of data chunks, the method comprising: executing, by a user on a client computing device, a first module; instructing the first module to query a second module at the first server in order to receive the first hash, wherein the query includes a label that references the image file; receiving, by the first module, the first hash from the second module; downloading, by the first module, the image file in response to receiving the first hash; determining, by the first module based on the received image file, which of the first plurality of data chunks are missing from a second plurality of data chunks stored on the client computing device, wherein the determination is based on comparing the hash of each of the first plurality of data chunks with hashes of the second plurality of data chunks; and downloading, by the first module, the missing data chunks to the client computing device.

Optionally, the first server and the client computing device store one or more labels that reference the image file. Optionally, more than one of the one or more labels reference the image file.

Optionally, the label is an alphanumeric data structure of a form namespace/name: tag.

Optionally, the hashes of the second plurality of data chunks are associated with and listed within each of a plurality of image files stored on the client computing device.

Optionally, the second server is configured as a webDAV server.

Optionally, the second server is implemented as a distributed cluster of servers. Optionally, a software-defined storage platform is implemented on the distributed cluster of servers. Optionally, the at least one cache node is configured as a RADOS Gateway pod.

Optionally, each of the first and second plurality of data chunks is generated based on a FastCDC algorithm.

The present specification also discloses a computer-implemented method of developing and testing console games, comprising: caching a first file and one or more second files at a first cache node in response to downloading, by a first module of a user's client computing device, the first and second files from at least one of first and second servers; instructing the first module of a user's client computing device to download the first file from the cache node, wherein the client computing device is in data communication with the cache node over a local area network at a first game studio; uploading, by the first module, the first file to a console development kit over a wide area network external to the first game studio, wherein the console development kit is located at a second game studio remote from the first game studio; instructing the first module to execute the first file on the console development kit; and streaming, from a second cache node, one or more portions of the one or more second files to the console development kit during execution of the first file, wherein the streaming is done over a local area network at a second game studio.

Optionally, executing the first file on the console development kit causes a game, corresponding to the first file, to be launched on the console development kit.

Optionally, the first file is an ELF (Executable and Linking Format) binary file, and wherein the one or more second files are game data files.

Optionally, the streamed one or more portions of the one or more second files are cached in a hard disk of the console development kit prior to being loaded in a random access memory of the console development kit.

Optionally, the streamed one or more portions of the one or more second files are loaded directly in a random access memory of the console development kit.

Optionally, the first file includes a plurality of instructions related to a virtual file system which, during execution of the first file, cause the second cache node to stream the one or more portions of the one or more second files to the console development kit.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skill in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 3A is a screenshot of a command line interface illustrating a first label pointing to a first 'image', in accordance with some embodiments of the present specification;

FIG. 3B is a screenshot of the command line interface illustrating a second label pointing to the first 'image', in accordance with some embodiments of the present specification;

FIG. 3C is a screenshot illustrating the command line interface with a modification of an attribute of the second label, in accordance with some embodiments of the present specification;

FIG. 3D is a screenshot illustrating the command line interface with an attribute of the second label being marked as expired, in accordance with some embodiments of the present specification;

FIG. 4A is a flowchart illustrating a method of data cleanup that is implemented as a result of execution of a Garbage Collection (GC) command on a client computing device, in accordance with some embodiments of the present specification;

FIG. 4B is a flowchart illustrating a method of data cleanup that is implemented as a result of execution of the GC command on one or both of object storage and metadata servers, in accordance with some embodiments of the present specification;

FIG. 6A is a flowchart illustrating a method of implementing data deduplication while uploading an 'image' and associated chunks to a metadata server and an object storage server, respectively, in accordance with some embodiments of the present specification;

FIG. 6B is a flowchart illustrating a method of implementing data deduplication while downloading one or more chunks from the object storage server, in accordance with some embodiments of the present specification;

FIG. 8 is a screenshot of a programming interface with various functions and file access commands pertaining to a virtual file system, in accordance with some embodiments of the present specification;

FIG. 10 is a flowchart of a plurality of exemplary steps of a method for developing and testing console games, in accordance with some embodiments of the present specification.

DETAILED DESCRIPTION

Figure 1:
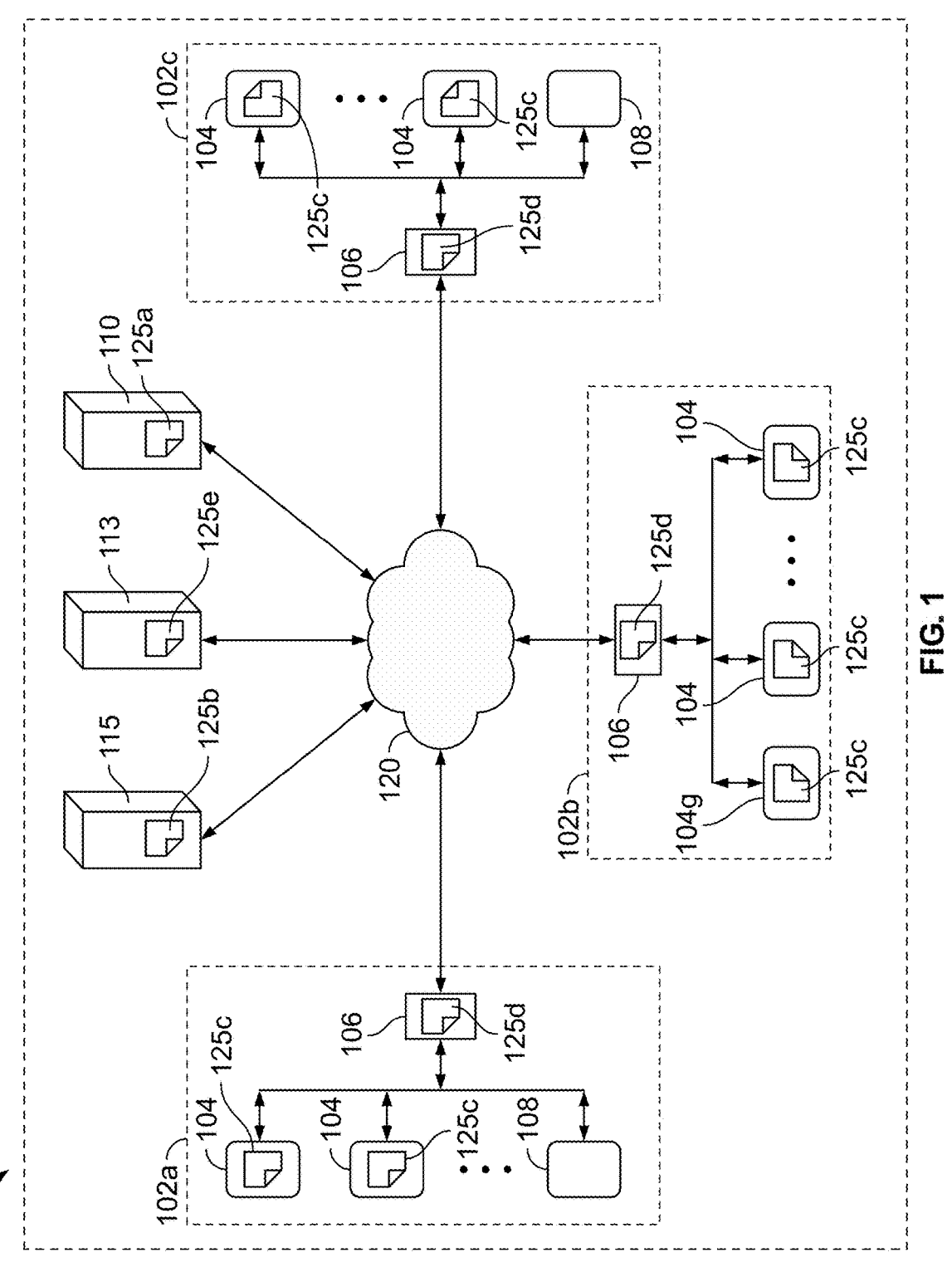
FIG. 1 is a block diagram of a system architecture configured for management and distribution of video game development content, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "WebDAV (Web Distributed Authoring and Versioning)", as used in this disclosure, refers to a set of extensions to the Hypertext Transfer Protocol (HTTP), which allows client computing devices to collaboratively author contents directly in an object storage server by providing facilities for concurrency control and namespace operations, thus allowing the Web to be viewed as a writeable, collaborative medium and not just a read-only medium.

A "console development kit", as used in this disclosure, refers to the hardware distributed by console manufacturers to game studios so that the game studio can build and test their games on the console which is configured to perform such functions.

The term Executable and Linking Format ("ELF" or "ELF binary"), as used in this disclosure, refers to a standard binary file format for executable files, object code, shared libraries, and core dumps. Some of the capabilities of ELF are dynamic linking, dynamic loading, imposing run-time control on a program, and an improved method for creating shared libraries. The ELF representation of control data, in an object file, is platform independent is, i.e. the ELF representation permits object files to be identified, parsed, and interpreted similarly, making the ELF object files compatible across multiple platforms and architectures of different size. The ELF files hold the code, data, and information about the program that an operating system and linkage editor need to perform the appropriate actions on these files.

The term "chunking", as used in this disclosure, refers to a process of breaking a file into data portions or chunks where each portion or chunk has a smaller number of bits, or requires a smaller amount of memory, relative to the original file. The memory allocated to the collective portions or chunks is approximately equal to the memory which would have been allocated to the original file prior to chunking.

The term "module", "application", "tool" or "engine" used in this disclosure may refer to computer logic configured and utilized to provide a desired functionality, service, or operation by programming or controlling a general-purpose processor. Stated differently, in some embodiments, a module, application, tool, or engine is configured to implement a plurality of instructions or programmatic code to cause a general purpose processor to perform one or more functions. In various embodiments, a module, application, tool or engine can be configured to be implemented in hardware, firmware, software, or any combination thereof.

The module, application, tool or engine may be interchangeably used with unit, logic, logical block, component, or circuit, for example. The module, application, tool or engine may be the minimum unit, or part thereof, which is configured to perform one or more particular functions.

In various embodiments, a computing device includes an input/output controller, at least one communications interface, and system memory. The system memory includes at least one random access memory (RAM) and at least one read-only memory (ROM). These elements are configured to be in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hardwired circuitry may be used in place of, or in combination with, software instructions for implementation of the processes of systems and methods described in this application. Thus, the systems and methods described are not limited to any specific combination of hardware and software.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

Overview

FIG. 1 is an architecture of a system 100 configured for management and distribution of video game development content, in accordance with some embodiments of the present specification. The system 100 comprises a plurality of geographically distributed video game development and testing sites or game studios 102 (102a, 102b and 102c). Each game studio or site 102 has a plurality of client computing devices 104 and at least one cache node 106 that are in data communication with each other over a wired and/or wireless LAN (Local Area Network). Each of the plurality of client computing devices 104 is associated with a person engaged in tasks related to video game development, testing and/or related tasks. Some of the sites, such as, for example, sites 102a and 102c also have one or more console development kits 108 that are in data communication over the LAN within the sites 102a, 102c. Similarly, at least one of the sites, such as, for example, site 102b has a client computing device 104g configured to enable an administrator to perform administrative functions.

In various embodiments, the plurality of client computing devices 104 are configured to periodically generate video game content comprising game data files and associated metadata. As used herein, the term video game content (as well as game data file and metadata) is inclusive of entire computer readable files or portions of a computer readable file. The computer readable file may include or represent text, numbers, data, images, photographs, graphics, audio, video, computer programs, computer source code, computer object code, executable computer code, ELF binary and/or a combination of these and similar content.

The system 100 further comprises at least one object storage server 110 and at least one metadata server 115. The object storage server 110 is configured to store game data files as objects using an object storage technology. In some embodiments, the at least one object storage server 110 is configured as a webDAV (Web Distributed Authoring and Versioning) server. Each of the cache nodes 106 are in data communication with the object storage server 110 over a wired and/or wireless WAN (Wide Area Network) 120. In some embodiments, the WAN 120 is a public network such as, for example, the Internet. Thus, in some embodiments, within each game studio or site 102, the plurality of client computing devices 104 are configured to communicate with the object storage server 110 through the associated cache node 106. In other words, none of the plurality of client computing devices 104 are enabled to directly communicate with object storage server 110. Also, in some embodiments, within each game studio or site 102, the plurality of client computing devices 104 are configured to communicate directly with the metadata server 115 and not through the associated cache node 106.

In accordance with some aspects of the present specification, the system 100 further comprises at least one CI server 113 that is configured to implement a continuous integration (CI) module, application, or engine that enables video game developers, associated with the plurality of client computing devices 104, to integrate game data into the at least one object storage server 110 (that acts as a shared repository) and associated metadata into the at least one metadata server 115, several times a day. Each check-in is then verified by an automated process (generated by the continuous integration module, application, or engine) to approve the integrations.

In some embodiments, the at least one object storage server 110 is configured to implement a server-side object management module, application, or engine 125a. In some embodiments, the at least one metadata storage server 115 is configured to implement a server-side metadata management module, application or engine 125b. In some embodiments, the at least one CI server 113 is configured to implement a CI module, application, or engine 125e. In embodiments, each of the plurality of client computing devices 104 is configured to implement a client-side content management module, application or engine 125c. In embodiments, each of the cache nodes 108 is configured to implement a content caching management module, application or engine 125d. In some embodiments, the CI module, application or engine is a single binary file which is statically linked (that is, has all related programmatic code contained in a single executable module) and installed on the server 113. In embodiments, the CI module 125e is configured to automatically interact with the object storage server 110 and metadata server 115. The client-side content management modules 125c (at client computing devices 104), via the content caching management module 125d (at cache nodes 106), are configured to be in data communication with the server-side object management module 125a (at object storage server 110). The client-side content management modules 125c (at client computing devices 104) are configured to be in data communication with the server-side metadata management module 125*b* (at metadata server 115) directly (and not through the content caching management module 125*d* at cache nodes 106).

In various embodiments, each of the modules 125*a*, 125*b*, 125*c*, 125*d* and 125*e* is configured to implement a plurality of instructions or programmatic code to perform a plurality of associated functions or tasks. For example, the client-side content management module 125*c* when prompted by a user, is configured to generate an interface that enables a user of the client computing device 104 to issue one or more commands prompting the module 125*c* to perform one or more functions or tasks. In some embodiments, the interface is a command line interface (CLI). However, in alternate embodiments, the interface may be a graphical user interface (GUI). As described henceforth, in various embodiments, the metadata server 115 stores a list of all chunks of all images, a list of all image IDs (i.e. their SHA1 hash), a mapping between chunks and image IDs, and a list of labels, and the image IDs to which they point or refer.

Image Files

In some embodiments, the client-side content management module 125*c* when prompted by a user, is configured to generate an 'image'. In the context of the present specification, an 'image' is a bundle of an image manifest and a plurality of game files with optional environment variables and a plurality of commands (based on a custom declarative language) to be run with the files. Thus, in embodiments, the term "image" may be used to refer to a) the image manifest (the .json file) and b) the image data chunks collectively, as a cohesive whole. In some other embodiments, the term image may be used to refer to the .json file. Therefore, the term "image" may be used to refer to one or the other, and should be taken in context of use throughout the specification.

In embodiments, a user passes instructions/commands, via the interface (CLI or GUI) generated by the module 125*c* on the user's client computing device 104, to prompt the module 125*c* to perform specific tasks. In some embodiments, in order to generate an 'image' a user a) first creates an image definition file that includes instructions/commands related to which of a plurality of game files need to be bundled together as well as how these game files should be bundled together by the module 125*c* and *b*) thereafter the user issues a command, referred to as a BUILD command, that causes the module 125*c* to read the instructions in the image definition file and accordingly generate an 'image'.

Figures 2A, 2B:
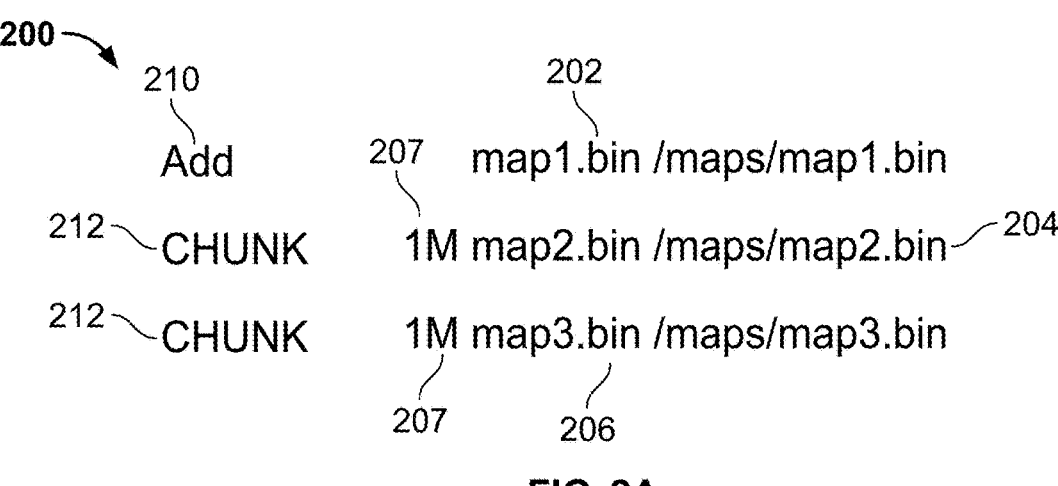
FIG. 2A is a screenshot of an exemplary image definition file, in accordance with some embodiments of the present specification.
FIG. 2B is a screenshot of a truncated version of an 'image' file, in accordance with some embodiments of the present specification.

As an example, FIG. 2A shows an image definition file 200 wherein the user has chosen to bundle together first game file 202, second game file 204, and third game file 206. Additionally, the image definition file 200 provides instructions/commands related to how the first game file 202, second game file 204, and third game file 206 are required to be bundled together. An ADD instruction 210 is directed towards adding the entire first game file 202 as a single chunk. However, each of the CHUNK instructions 212 is directed towards splitting the second game file 204 and third game file 206 into a plurality of chunks (or data chunks, or data portions) in accordance with a predefined 'chunking' scheme (which is described below in the section titled "Chunking"). In one chunking scheme, for example, a size of each of the plurality of chunks may be pre-defined as a fixed number. For example, in the image definition file 200, the user has chosen to have a size 207 of each chunk to be 1 MB, consequently, when the user issues the BUILD command for the image definition file 200, the command is configured to cause the module 125*c* (FIG. 1) to generate an 'image' that bundles together the first game file 202, second game file 204, and third game file 206 such that the first file 202 is included as a single chunk while each of the second file 204 and third file 206 is split into a plurality of chunks.

While generating the 'image', in response to the BUILD command, the module 125*c* is also configured to output a) a unique identifier associated with the 'image' itself, b) a unique identifier associated with each of the plurality of files included in the 'image', c) a unique identifier associated with each chunk of each of the plurality of files included in the 'image', d) a size of each of the plurality of files included in the 'image' and e) a size of each chunk of each of the plurality of files included in the 'image'. In some embodiments, the unique identifier associated with the 'image' is a result of a hash function of the data indicative of the 'image', the unique identifier associated with each of the plurality of files is a result of a hash function of the data indicative of each of the plurality of files, the unique identifier associated with each chunk is a result of a hash function of the data indicative of each chunk. In some embodiments, the hash function is SHA-1. However, in alternate embodiments, the hash function may be other functions such as, but not limited to, MD5, SHA-2 or SHA-3.

As an example, FIG. 2B shows a truncated version of an 'image' 220 including the second file 204 that has an associated unique identifier or hash 204' ('1bb7') and a size 204" (of 248 MB). Further, the second file 204 has a plurality of chunks—a first two of which are shown as a first chunk 206 having an associated unique identifier or hash 206' ('1bf0'), size 206" (1 MB) and a second chunk 208 having an associated unique identifier or hash 208' ('e686'), size 208" (1 MB).

Thus, an 'image' lists (or is a manifest of) hashes and sizes of all the files that are bundled together and, for each file, the hashes and sizes of all the chunks that make up the file. Thus, all content within system 100, and therefore the CI module, application or engine of the present specification, is content-addressable such that it can be retrieved based on its content, not its location. That is, in some embodiments, the name and identifier of each file is the hash of its content or data. In some embodiments, an 'image' is a JSON (JavaScript Object Notation) file.

As a result of generating an 'image', in response to the BUILD command, the module 125*c* a) stores all chunks of all files (listed in the 'image') into a folder, referred to as an 'objects' folder, on the user's client computing device 104, and b) stores the 'image' in another folder, referred to as an 'images' folder, on the user's client computing device 104. All 'images' and chunks are named by their associated hashes thereby making all content immutable. Thus, storage of a chunk or 'image' can never change since that would change the associated hash (unique identifier) and thus the content name would also change.

It should be appreciated that when an 'image' is generated using the BUILD command or downloaded (or pulled) from the metadata server 115 (as described in method 600*b* of FIG. 6B), the client-side content management module 125*c* is configured to store the associated chunks in the 'objects' folder on the user's client computing device 104. Specifically, the chunks are stored by their respective unique identifiers or hashes as names. This is advantageous for performing data cleanup and deduplication tasks.

Figure 7:
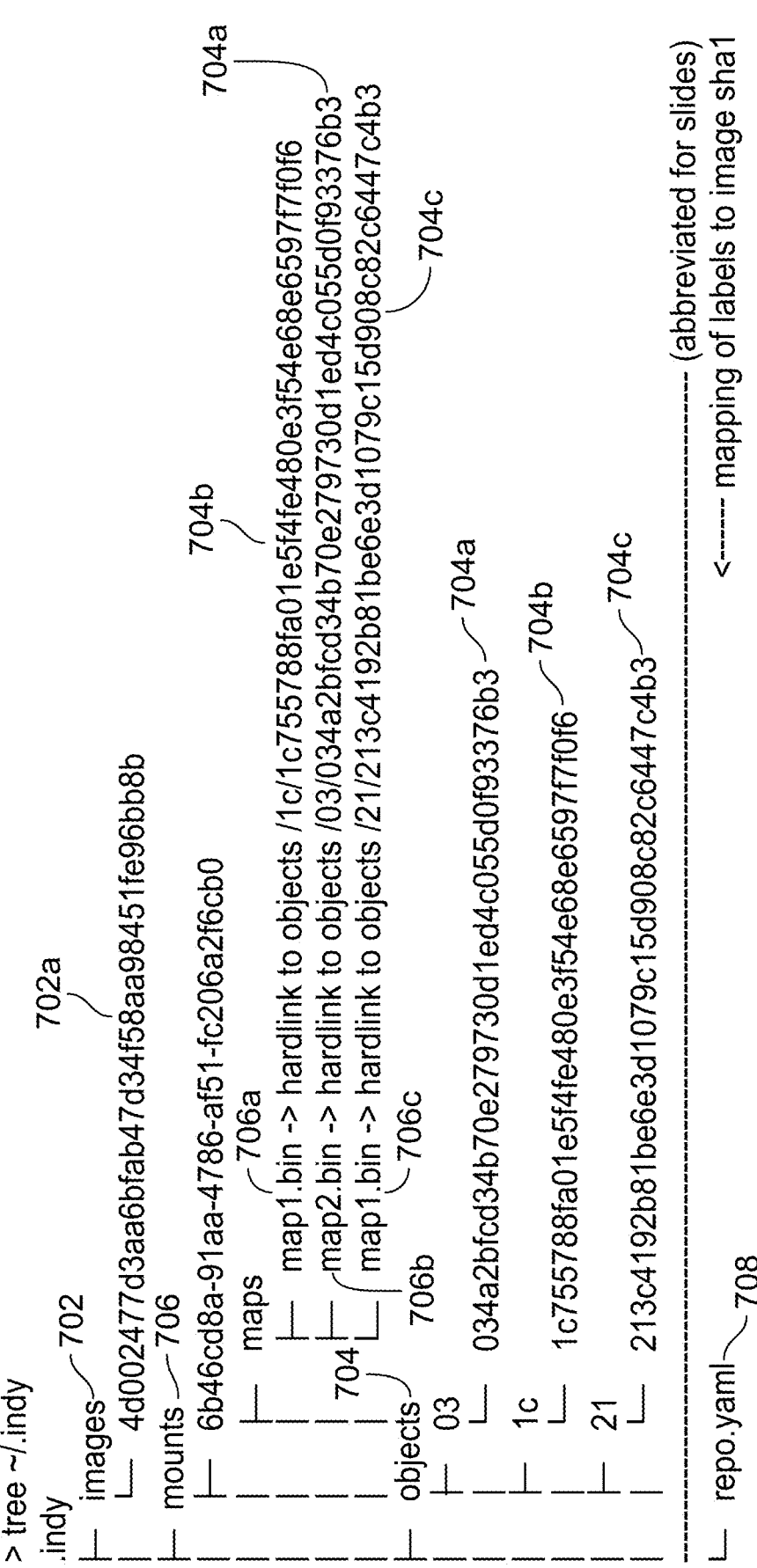
FIG. 7 is a screenshot showing an exemplary storage or directory structure on a user's client computing device, in accordance with some embodiments of the present specification.

Users, however, typically want to see the files (corresponding to the chunks) with their user-defined or user-friendly names and directory structure. To enable this, the user issues a MOUNT command, for an 'image', to the client-side content management modules 125*c*. The MOUNT command is configured to cause the client-side content management modules 125c to a) generate a mount (that is, an instance of the 'image') that is stored in a folder, referred to as a 'mounts' folder, and b) create a directory structure with user-defined names of chunks that are hard-linked to the corresponding chunks in the 'chunks' folder. As known to persons of ordinary skill in the art, hard links are a file system concept where two file paths may correspond to the same file data. Hard links are thus directory entries that associate names with file data. Hard links are extremely fast to create and do not cause any copying. Also, creating mounts is almost instantaneous, and a plurality of mounts can be created, as needed, with no additional disk space usage. FIG. 7 shows an exemplary storage or directory structure on a user's client computing device, in accordance with some embodiments of the present specification. An 'images' folder 702 is used to store image manifest files 702a having a hash of its contents as name, an objects folder 704 is used to store first chunk 704a, second chunk 704b, and third chunk 704c each having a corresponding hash as a name, and a mounts folder 706 stores mounts (the 6b46 folder is an example of a mount). The figure also shows first, second and third mounted files 706a, 706b and 706c, wherein the first mounted file 706a is hard-linked to the second chunk 704b, the second mounted file 706b is hard-linked to the first chunk 704a and the third mounted file 706c is hard-linked to the third chunk 704c.

In accordance with another aspect of the present specification, the client-side content management module 125c is configured to allow the user to perform a union or integration of two or more 'image' files. When instructed by the user, the module 125c takes two or more source 'image' files and produces a single superset 'image' file with a union of all game files from the two or more source 'images'. A conventional process of creating a superset 'image' involves opening a first 'image' file and serially adding the building blocks, that is the source 'image' files, to create the first 'image' file. In embodiments, the CI module, application or engine of the present specification parallelizes this process and uses multiple jobs to create the smaller source 'image' files in parallel. Thereafter, the CI module, application or engine is configured to use a manifest to combine the smaller source 'images' in order to generate a larger superset 'image' file.

Labels

As discussed earlier, the BUILD command is configured to output a hash (for example, SHA-1) that uniquely identifies an 'image'. However, it may be inconvenient for a user to reference 'images' using their associated hashes. Therefore, in some embodiments, the BUILD command is further configured to enable the user to specify and generate a human comprehensible label that acts as a pointer to the hash associated with the 'image'. The label, in some embodiments, is an alphanumeric data structure of a form "namespace/name:tag". As an example, FIG. 3A shows a command-line interface (CLI) 300 wherein a user, in the BUILD command, specifies a first label 302a, referred to as aastley/gdc-test:v1, that points to a first 'image' that has a first 'image' hash 302b. The IMAGES command is configured to cause a list to be displayed of all the 'images' stored locally in the user's client computing device. As shown, a list 370 displays the first label 302a associated with the first 'image' having the first 'image' hash 302b. The list 370 also displays additional attributes such as, but not limited to, a time elapsed attribute 302c indicative of an amount of time elapsed since the first 'image' hash 302b was modified, a time to live (TTL) attribute 302d indicative of a period of time after which the first label 302a will automatically expire, a size attribute 302e indicative of a size of the first 'image' associated with the first 'image' hash 302b, a total number of files attribute 302f indicative of the number of files listed in and associated with the first 'image', and a chunks attribute 302g indicative of a plurality of chunks related to the first 'image'. In embodiments, only labels have TTLs. Thus, when a label "expires", it is deleted. If an image no longer has any labels referencing it, then it is also deleted (along with chunks). In embodiments, a label's TTL is a time in the future relative to the last modification time. Upon label creation (using BUILD for creation of an image or pulling an image), the modifiedAt and createdAt times are equal. If the TTL is updated again, the modifiedAt time will be set to now( ) while the createdAt will be left as-is, denoting a change in the time associated with the label.

Since labels are essentially pointers, users can associate as many different labels as required with the same 'image'. For example, FIG. 3B shows the user generating a second label 304a, referred to as aastely/my-awesome-label:123, that also points to the first 'image' hash 302b. On running the IMAGES command, a list 372 is generated that displays the first label 302a associated with the first 'image' hash 302b as well as the second label 304a also associated with the first 'image' hash 302b.

Therefore, in some embodiments, a label has at least one user-defined and customizable attribute that is defined at the time of generation of the label. The at least one attribute is indicative of a time span of existence of the label and is referred to as, for example, a time to live (TTL). Thus, the TTL attribute indicates a period of time after which the label will automatically expire. Referring back to FIG. 3A, the first label 302a has the TTL attribute 302d of infinite. Similarly, in FIG. 3B, the second label 304a also has a TTL attribute 304d of infinite. In some embodiments, infinite is a default TTL attribute auto-assigned to a label at the time of generation of the label. However, the user can update or modify the TTL attribute. For example, as shown in FIG. 3C, the user issues a command to update or modify the TTL attribute 304d (associated with the second label 304a) to 18 seconds.

Referring back to FIG. 1, as a result of generating a label, the module 125c is configured to store the label in association with the 'image' hash on the user's client computing device 104. Thus, a user's client computing device 104 locally stores an 'image' (having a hash as a unique identifier) along with an associated label (that points to the 'image') as well as a plurality of chunks that are associated with one more files in the 'image'. In various embodiments, for storage, the module 125c enables the user to upload the 'image' (referenced using an associated hash as name) along with the associated label (that points to the 'image') to the metadata server 115 and the plurality of chunks, corresponding to one or more files in the 'image', to the object storage server 110 (wherein each of the plurality of chunks is referenced using an associated hash as name).

Data Cleanup

In accordance with some aspects of the present specification, the TTL attribute of a label enables a data cleanup task on the object storage server 110, the metadata server 115, and a user's client computing device 104. To initiate data cleanup on the client computing device 104, the user issues a GC (garbage collection) command to the client-side content management module 125c (in an interface generated by the module 125c). In some embodiments, to initiate data cleanup on the object storage server 110 and the metadata server 115, an administrator issues the GC command to the server-side object management module 125*a* (through the interface generated by the client-side content management module 125*c*) and to the server-side metadata management module 125*b* (through the interface generate by the client-side content management module 125*c*), respectively. Each of the modules described above is configured to execute the GC command in accordance with the programmatic instructions contained therein.

In some embodiments, the GC command is executed on the object storage server 110 and the metadata server 115 by the administrator through an interface generated by the client-side content management module 125*c* while using a remotely located client computing device 104*g*. In some embodiments, the GC command is issued manually by the user to the client-side content management module 125*c* on their client computing device 104 and by the administrator to the server-side object management module 125*a* on the object storage server 110 and to the server-side metadata management module 125*b* on the metadata server 115. In some embodiments, the server-side object management module 125*a*, the server-side metadata management module 125*b* and the client-side content management modules 125*c* are configured to automatically execute the GC command on a predefined periodic basis (say, for example, every 10 minutes). In some embodiments, the GC command is automatically executed on one or both of the object storage server 110 and the metadata server 115 on a predefined periodic basis (say, for example, every 10 minutes) whereas the command is manually issued by the user on his client computing device 104. In some embodiments, the metadata server 115 is configured to automatically trigger the GC command on a predefined periodic basis (say, for example, every 15 minutes). It should be appreciated that the cache nodes 106 do not need cleanup since all data is content-addressable and the nodes 106 are strictly cache. The cache nodes 106 download data from upstream (object storage server 110) and cache it on disk (and serve it to the client). If the disk becomes full, the cache nodes 106 use a LRU (least recently used) algorithm to delete old data from disk. Thus, the cache is "self-cleaning".

Referring now to FIG. 3D, when the time span defined in the TTL attribute 304*d* expires, the TTL attribute 304*d* of the second label 304*a* is automatically marked as 'expired'. Now, when the GC command is executed, it is configured to cause a data cleanup method to be implemented. FIG. 4A is a flowchart of a plurality of steps of a method 400*a* of data cleanup that is implemented as a result of execution of a GC command configured to operate on a client computing device 104, in accordance with some embodiments of the present specification. At step 402*a*, all labels, whose TTL attribute is marked as expired, are automatically deleted. At step 404*a*, all 'images' that are no longer referenced by or associated with any labels, are automatically deleted. Finally, at step 406*a*, all chunks that are no longer referenced by or associated with any remaining 'images', are automatically deleted. In embodiments, all chunks are reference counted prior to the step 406*a*.

FIG. 4B is a flowchart of a plurality of steps of a method 400*b* of data cleanup that is implemented as a result of execution of a GC command configured to be triggered automatically on one or both of the object storage and metadata servers 110, 115, in accordance with some embodiments of the present specification. In some embodiments, the GC command is configured to be triggered automatically on the metadata server 115. It should be appreciated that the method 400*b* is executed based on a predefined time schedule (say, every 10 minutes or 15 minutes) and uses a SQL database to track the processes corresponding to the method 400*b*. At step 402*b*, all labels, whose TTL attribute is marked as expired, are automatically deleted at the metadata server 115. At step 404*b*, all 'images' that are no longer referenced by or associated with any labels, are automatically deleted at the metadata server 115. The metadata server 115 is first queried (using an SQL query) to find all 'images' that are no longer referenced by or associated with any labels in order to then delete such 'images'. Finally, at step 406*b*, all chunks that are no longer referenced by or associated with any remaining 'images' (at the metadata server 115), are automatically deleted at the object storage server 110. In embodiments, all chunks (on the object storage server 110) are reference counted prior to the step 406*b*. The object storage server 110 is first queried (using an SQL query) to find all chunks that are no longer referenced by or associated with any remaining 'images' in order to then delete such chunks. In some embodiments, the chunks (to be deleted) are inserted into a "delete queue". Multiple threads are generated that work through the "delete queue". Each thread takes a chunk from the "delete queue", issues an HTTP DELETE to the object storage server 110, and then deletes the chunk from the SQL database. In some embodiments, a plurality of programmatic instructions or code/SQL queries are executed to ensure that the deletion of chunks does not conflict with new 'images' being pushed. (For example, if chunk A is about to be deleted, but a new 'image' is being pushed which contains chunk A, the programmatic code ensures that the "race" resolves in a well-defined manner such that chunk A is either deleted and then re-uploaded or not deleted at all, in such a scenario).

Chunking

As discussed earlier, an image definition file includes instructions/commands related to which of a plurality of game files need to be bundled together as well as how these game files should be bundled together, in an 'image', by the module 125*c*. For example, a CHUNK instruction, in the image definition file, when read by a BUILD command is configured to cause the module 125*c* to split a game file (to be included in the 'image') into a plurality of chunks (or data chunks) in accordance with a predefined chunking scheme out of a plurality of following chunking schemes:

A first chunking scheme is based on executing an ADD command to add or include the entire/whole game file to the 'image' as a single chunk. However, this scheme leads to inefficient deduplication since a single byte change would cause a hash, associated with the single chunk, to change resulting in the entire file/chunk to be downloaded from or uploaded to the object storage server 110 (refer to methods 600*a*, 600*b* of FIGS. 6A and 6B).

A second chunking scheme is based on chunks having a defined fixed size. In the second chunking scheme, executing a CHUNK command with a size attribute, causes the game file to be split into a plurality of chunks wherein each of the plurality of chunks has a fixed size defined in the size attribute. For example, if the size attribute is 1 MB then the game file is split into a plurality of chunks wherein each of the plurality of chunks is 1 MB. However, in a subsequent iteration or update of the game file if the user adds bytes to a chunk then, due to there being fixed-size chunks, the data indicative of all subsequent chunks also changes (due to 'byte shifting'). Thus, a hash associated with the chunk to which bytes were added, as well as the respective hashes of all subsequent chunks, change which results in all of these chunks to be downloaded from or uploaded to the object storage server 110 (refer to methods 600*a*, 600*b* of FIGS. 6A and 6B).

Figure 5:
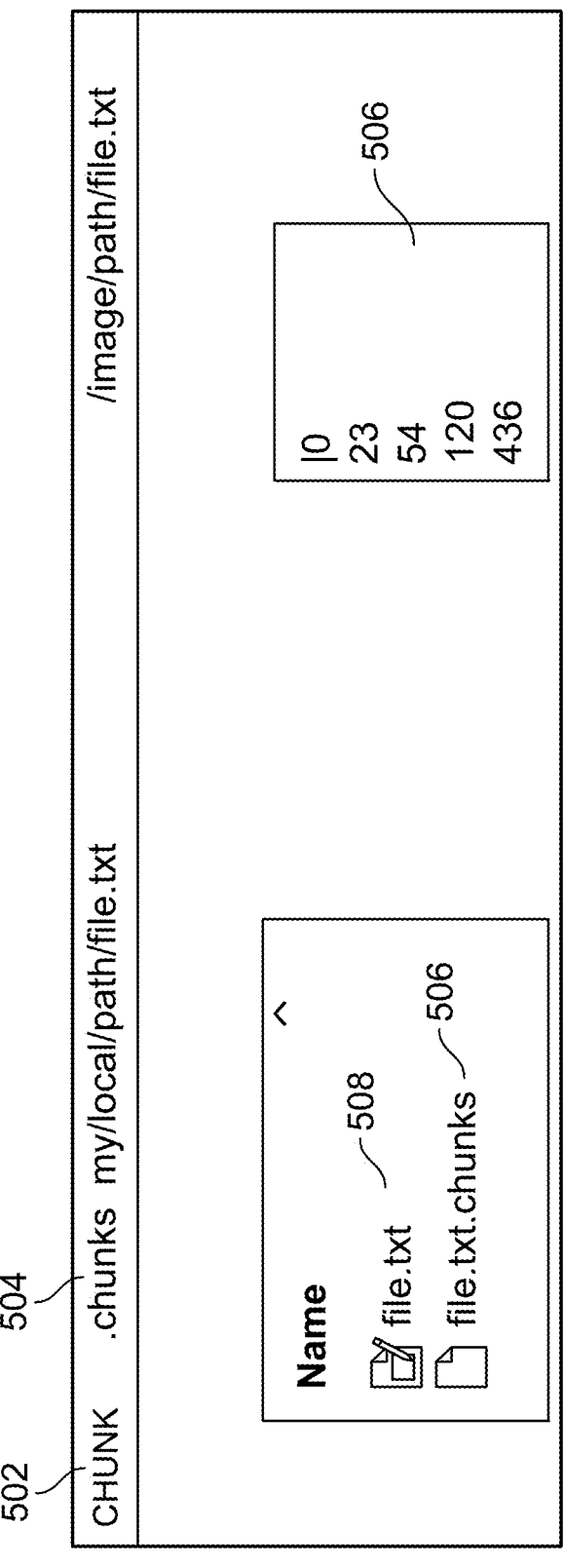
FIG. 5 is a screenshot illustrating a size-defining file in the context of a custom-size chunking scheme, in accordance with some embodiments of the present specification.

A third chunking scheme is based on chunks having a defined custom size. In the third chunking scheme, the CHUNK command is configured to specify an extension attribute for a size-defining file whereby, in turn, module 125c (FIG. 1) is configured to look for the size-defining file (corresponding to the game file that is chunked) using the extension attribute. In some embodiments, the size-defining file is a single column CSV (comma-separated values) file with a plurality of entries wherein each entry gives a byte offset of each chunk. For example, as shown in FIG. 5, the CHUNK command 502 includes a '.chunks' extension 504 for a size-defining file 506 corresponding to the game file 508. In this example, the size-defining file 506 includes five entries wherein each entry is indicative of a byte offset for each chunk. So, in this example, the first chunk would be from byte 0 to 22, the next from 23 to 53, and so on. The third chunking scheme allows a user to specify the cut points (or natural data boundaries) where the module 125c should split a game file so that each chunk is a logical portion of the game file. For example, if the game file is a map file then one logical portion may include texture data and another logical portion may include model data. This means that in a subsequent iteration or update of the game file if the user changes, for example, a single texture then the only chunk that is modified is the chunk including texture as the logical portion. Consequently, only a hash of the modified chunk is changed (allowing for the remaining chunks to be deduplicated). However, the third chunking scheme requires the user to know the exact file structure (in order to specify the natural data boundaries and split the file into logical portions), thus necessitating the user to perform an additional manual step in order to generate the size-defining file. Additionally, the chunks, based on natural boundaries and logical portions, may create extremely small-sized or very huge-sized chunks.

A fourth chunking scheme is based on an automatic CDC (Content-Defined Chunking) or FastCDC (Fast and Efficient Content-Defined Chunking) algorithm. As known to persons of ordinary skill in the art, the CDC algorithm computes a hash value of a data stream byte by byte and splits the data stream into chunks when the hash value meets a predefined value (for example, an average chunk size needed). However, comparing a string byte-by-byte introduces heavy computation overhead. FastCDC uses a fast-rolling Gear hash algorithm, skipping a minimum length, normalizing the chunk-size distribution, and rolling two bytes each time to speed up the CDC algorithm. Thus, in the fourth chunking scheme, an average chunk size attribute is passed to the CHUNK command that, based on FastCDC, calculates the chunk offsets in order to split the game file into a plurality of chunks. Unlike fixed-length chunks, variable-length chunks are more resistant to byte shifting. The fourth chunking scheme does not require the user to have a prior knowledge of the file structure.

In some embodiments, a chunk size ranging from 1 MB to 5 MB offers an optimal balance between computational speed, data deduplication and HTTP retries.

Data Deduplication

In accordance with some aspects of the present specification, chunking one or more game files enables efficient data deduplication in the system 100. FIG. 6A is a flowchart of a plurality of steps of a method 600a of implementing data deduplication while uploading (or pushing by initiating a POST command) an 'image' to the metadata server 115 and associated chunks to the object storage 110, in accordance with some embodiments of the present specification. Referring now to FIGS. 1 and 6A, at step 602a, a user issues a POST command to the client-side content management module 125c (on his client computing device 104) to upload the 'image' to the metadata server 115 (and later on the chunks associated with the 'image' to the object storage server 110). In some embodiments, the POST command includes a hash associated with the 'image'.

In various embodiments, all data communication or data transfer operations, in method 600a, between the client computing device 104 and the object storage 110 is effectuated through at least one cache node 106 associated with the site 102 of the client computing device 104. However, all metadata operations from the client computing device 104 go directly to the metadata server 115. Therefore, in some embodiments, the POST command is first received by the content caching management module 125d, at a cache node 106 associated with the user's client computing device 104, and then passed on to the metadata server 115.

At step 604a, the server-side metadata management module 125b, upon receiving the 'image', is configured to use the image manifest (stored in the object storage server 110) and query an internal database to determine which chunks do not already exist (that is, the chunks that are missing) on the object storage server 110. In some embodiments, the server-side metadata management module 125b is configured to determine the missing chunks by comparing the unique identifiers or hashes, of various chunks, listed in the 'image' or image manifest against the unique identifiers or hashes, of various chunks, stored in the internal database.

At step 606a, the server-side metadata management module 125b is configured to communicate, to the client-side content management module 125c, one or more unique identifiers or hashes of the chunks missing in the database of the metadata server 115.

At step 608a, upon receiving the unique identifiers or hashes of the missing chunks the client-side content management module 125c is configured to upload the missing chunks (that is, the data associated with the missing chunks), in parallel to each other, to the object storage server 110. The determination and uploading of the missing chunks results in data deduplication at the object storage 110 and metadata server 115. In some embodiments, the missing chunks are first received by the content caching management module 125d which is configured to then upload the missing chunks to the object storage server 110. In this process, the missing chunks may, in some embodiments, be cached by the content caching management module 125d. In embodiments, the missing chunks are uploaded to the object storage server 110 in parallel, or simultaneously, in order to improve performance.

At step 610a, the client-side content management module 125c is configured to issue another POST command to the server-side metadata management module 125b indicating that the uploading of the missing chunks has been finished, completed, or accomplished.

At step 612a, the client-side content management module 125c issues yet another POST command to the server side metadata management module 125b creating a label association with the 'image'.

It should be appreciated that data deduplication is enforced in the system 100 since only the missing chunks are uploaded to the object storage server 110. Since, only the missing chunks are uploaded this results in bandwidth savings on the WAN 120.

FIG. 6B is a flowchart of a plurality of steps of a method 600b of implementing data deduplication while downloading (or pulling by initiating a PULL command) one or more chunks from the object storage server 110 (FIG. 1), in accordance with some embodiments of the present specification. Referring now to FIGS. 1 and 6B, at step 602*b*, a user through his client-side content management module 125*c* (on his client computing device 104) issues a query to the metadata server 115 to receive a unique identifier or hash of an 'image manifest'. The query includes a label associated with the 'image manifest' that the user wants to download.

In various embodiments, all data communication or data transfer operations, in method 600*b*, between the client computing device 104 and the object storage 110 is effectuated through at least one cache node 106 associated with the site 102 of the client computing device 104. However, all metadata operations from the client computing device 104 go directly to the metadata server 115.

At step 604*b*, upon receiving the unique identifier or hash the client-side content management module 125*c* is configured to download the 'image manifest' (associated with the unique identifier or hash) from the metadata server 115.

Thereafter, at step 606*b*, the client-side content management module 125*c* is configured to determine a list of one or more chunks missing at the user's client computing device 104 by comparing the unique identifiers or hashes of the chunks listed in the received 'image manifest' against the unique identifiers or hashes of one or more chunks already stored locally on the user's client computing device 104.

At step 608*b*, the client-side content management module 125*c* is configured to download the one or more missing chunks from the object storage server 110, which, in an embodiment, the chunks are downloaded in parallel. For downloading in parallel, the system uses multiple compute threads to download the chunks to disk at the same time (that is, as opposed to downloading chunk A first, then chunk B, then chunk C, etc., the system is configured to download chunks A, B, and C at the same time). In some embodiments, at least a portion of the one or more missing chunks is downloaded from the cache node 106 in case the cache node 106 has some of the missing chunks cached. The determination and downloading of the missing chunks result in data deduplication at the user's client computing device 104. In some embodiments, the one or more missing chunks are first cached at the cache node 106 from where the missing chunks are then transferred to the requesting client-side content management module 125*c*. Alternatively, if the missing chunks are already cached at the cache node 106 then these missing chunks are downloaded from the cache node 106.

Thereafter, at step 610*b*, the client-side content management module 125*c* is configured to update all data structures (that is, 'images' and chunks) in the user's client computing device 104. In other words, the downloaded 'image manifest' is stored in the 'images' folder while the downloaded missing chunks are stored in the 'objects' folder in the user's client computing device 104.

It should be appreciated that data deduplication is enforced in the system 100 since only the missing chunks are downloaded to the user's client computing device 104 from the object storage server 110 (or the cache node 106, if already cached at the node 106). Since only the missing chunks are downloaded this results in bandwidth savings on the WAN 120. Additionally, subsequent downloads of the 'image' and associated missing chunks by other client computing devices can be affected from the cache node 106 itself (that has the cached 'image' and associated missing chunks).

Data Verification

In accordance with some aspects of the present specification, the server-side object management module 125*a*, the server-side metadata management module 125*b*, the client-side content management module 125*c* and the content caching management module 125*d* are individually configured to auto-perform data verification of 'images' and chunks at every single step of uploading (that is, PUSH) and downloading (that is, PULL) in order to prevent and safeguard against chunk corruption in the system 100. In various embodiments, as the modules 125*a*, 125*b*, 125*c* and 125*d* read data from a storage system (such as, for example, a hard disk or from a network device) each of the modules is configured to automatically re-hash the data and verify that it matches with whatever it is expected to match with.

Additionally, in some embodiments, the user is enabled to manually issue a VERIFY command to each of the modules 125*a*, 125*b*, 125*c* and 125*d* in order to verify the data integrity of all 'images' and chunks. In some embodiments, the user may use a CLI or GUI based interface generated by the client-side content management module 125*c* of his computing device 104 to issue the VERIFY command to the module 125*c* to perform data verification on his computing device 104 and/or issue the VERIFY command to the modules 125*a*, 125*b* and 125*d* remotely via the client-side content management module 125*c*. In some embodiments, the VERIFY command is executed manually on a predefined periodic basis (for example, say, every night).

Cache Nodes 106

Referring back to FIG. 1, the system 100 uses at least one cache node 106 at each site 102 without having to be concerned about cache coherency since all content in the system 100 is content-addressable and immutable such that it can be retrieved based on its content, not its location. In various embodiments, all client computing devices 104 are configured to download and upload data through the cache nodes 106 and do not connect to the object storage server 110 directly. This has several benefits, including, but not limited to:

Firstly, a cache node 106 can cache files. So, if a first client computing device 104 at a site 102 downloads an 'image' or 'image manifest' and associated chunks (which are cached at the cache node 106) then, after some time (say, after 30 minutes), a second client computing device 104 at the same site 102 can download the chunks associated with the 'image' or 'image manifest' directly from the cache node 106. There is a high likelihood that a substantial portion of the chunks required by the second client computing device 104 coincide with the chunks already cached at the cache node 106. This substantially reduces WAN 120 traffic, which is a precious resource, as well as reduces request load on the object storage server 110.

Secondly, cache nodes 106 can be configured and controlled such that they enable sophisticated and aggressive TCP tuning. For example, the BBR (Bottleneck Bandwidth and Round-trip propagation time) congestion control algorithm can be implemented at the cache nodes 106. This ensures that all WAN 120 traffic is as optimized as possible.

Thirdly, cache nodes 106 can be scaled to as many as needed. If a site 102 has a large number of client computing devices 104, additional cache nodes 106 can be selectively added at the site 102 and load balancing can be implemented between all cache nodes 106 at the site 102. This also adds a layer of fault tolerance. If one or more cache nodes 106 experiences outage due to maintenance or a crash then the client computing devices 104, at the site 102, can switch to other working cache nodes 106 at the site 102.

Gaming Console Development

For developing video games targeting specific gaming consoles (referred to also as 'console development'), a host PC (personal computer), also referred to as devkit host, is typically configured to be in data communication with a console development kit. Referring back to FIG. 1, the site 102*a*, for example, has a console development kit 108 that is in data communication with at least one client computing device 104 that acts as a devkit host. In order to launch a game, an ELF binary file and game files are uploaded from the client computing device 104 to the console development kit 108. In order to do so, the client computing device 104 is configured to first download (pull) the ELF binary and game files from the object storage server 110 (via a cache node 106 associated with the game studio or site 102*a* of the client computing device 104) then mount the files (using the MOUNT command) and thereafter, in some embodiments, transfer all the files to the console development kit 108 and launch the game. Console manufacturers such as, for example, Xbox and PlayStation support either a first approach of uploading all files from a client computing device to a console development kit before launching the game or a second approach of streaming the files from the client computing device to the console development kit just-in-time. In both approaches, however, the ELF binary and game files first need to be downloaded onto the client computing device.

It should be appreciated that the console development kits 108 are expensive, usually available in limited supply and not available at all game studios or sites 102. Therefore, oftentimes, a client computing device 104 at a first site 102*b* may need to launch and test a game on a console development kit 108 available at a second site 102*a* (or 102*c*). In order to do so, the client computing device 104 at the first site 102*b* would need to be configured to upload the ELF and game files to the console development kit 108 at the second site 102*a*, via the WAN 120. However, this is undesirable since WAN bandwidth is both limited and quite slow due to latency issues.

In accordance with some aspects, the CI module, application or engine of the present specification is configured to implement a virtual file system for enabling efficient communication of game files between a client computing device 104 and a console development kit 108 (that may be located remotely from the client computing device 104). In some embodiments, the game abstracts all access to the virtual file system using an interface that comprises programmatic instructions or code to implement a plurality of relevant functions along with commands such as, for example, open, close, read, etc. FIG. 8 shows a programming interface 800 with various functions and file access commands 802 pertaining to the virtual file system, in accordance with some embodiments of the present specification.

Figure 9A:
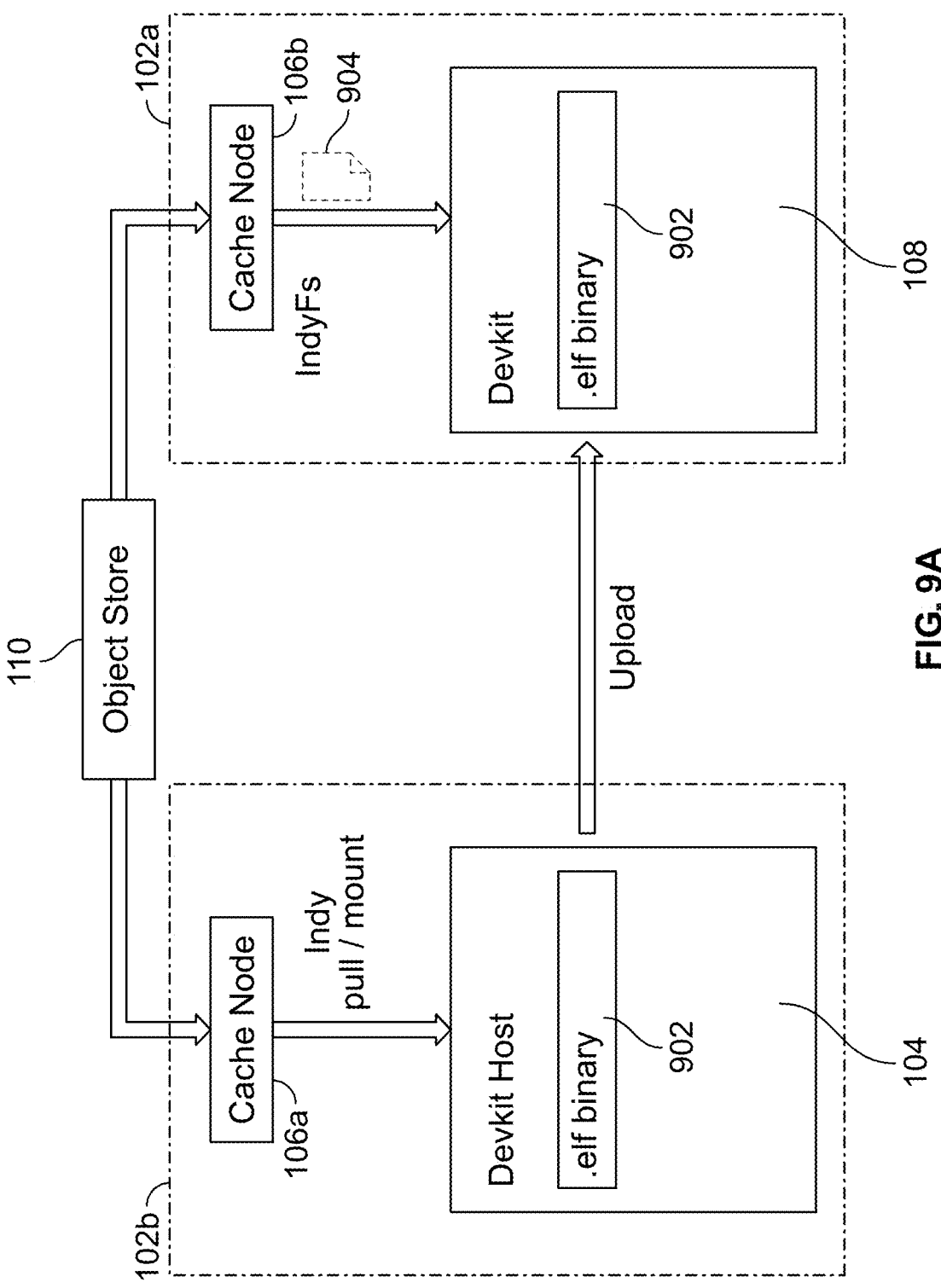
FIG. 9A is a block diagram showing data flow between a client computing device and a console development kit, through a cache node, in accordance with some embodiments of the present specification.

Referring now to FIGS. 1 and 9A, a client computing device 104 is configured to be in data communication with an associated cache node 106*a* over a LAN at a first game studio or site 102*b*. The client computing device 104 is in data communication with the object storage server 110, over the WAN 120, through the cache node 106*a*. The client computing device 104 is also configured to be in data communication, over the WAN 120, with a console development kit 108 located at a second game studio or site 102*a*. Further, the console development kit 108 is configured to be in data communication, over a LAN, with an associated cache node 106*b* of the first game studio or site 102*b*. The console development kit 108 is in data communication with the object storage server 110, over the WAN 120, through the cache node 106*b*. The architectural set-up of FIG. 9A is representative of a scenario where the client computing device 104 (devkit host) and the console development kit 108 are located at geographically different locations or game studios.

In a non-limiting exemplary scenario, the client computing device 104 is configured to implement the method 600*b* of FIG. 6B to download (or pull) the ELF binary data file 902 and associated chunks of a game from the server 110. Consequently, the associated chunks are cached by the content caching management module 125*d* at the cache node 106.

Therefore, operationally, a user issues a first command to the client-side content management module 125*c* (on his client computing device 104) which is configured to then cause the ELF binary file 902 to be downloaded on the client computing device 104 through the content caching management module 125*d* at the cache node 106, at site 102*b*. Subsequently, the chunks associated with the ELF binary data file 902 are received, at the client computing device 104), through the content caching management module 125*d* at the cache node 106*a*. Thereafter, the user issues a second command to the client-side content management module 125*c* which is configured to then cause the ELF binary file 902 to be uploaded, via the WAN 120, directly to the console development kit 108 and subsequently launch the game on the console development kit 108 (remotely using the client computing device 104). The game launch parameters include a name, identity or pointer to the cache node 106*b*. During game run, using the virtual file system, one or more of the game data files or chunks 904 are streamed on-the-fly from the content caching management module 125*d* (at the cache node 106*b*) to the console development kit 108, as and when needed in case the game data files or chunks 904 are already cached at the cache node 106*b*. If not, the game data files or chunks 904 may need to be downloaded from the object storage server 110 first, cached at the cache node 106*b* and subsequently served to the console development kit 108 over a LAN. Thus, the ELF 902 is uploaded directly from client computing device 104 to the console development kit 108 and not routed through the cache nodes 106*a*, 106*b*. In embodiments, the ELF is the executable file for the console development kit.

With the virtual file system, in order to launch the game, only the ELF binary file 902 is initially transferred from the client computing device 104 to the console development kit 108 over the WAN 120. Additionally, as and when needed during game run, only the required portions of the game data files 904 are downloaded by the console development kit 108 from the cache node 106 over the LAN at the site 102*a*. Thus, the virtual file system of the present specification greatly reduces data traffic over the WAN 120 which is typically fraught with low bandwidth availability and latency issues. This is in contrast to conventional approaches where the entire ELF binary 902 and all game data files 904 needed to be transferred—first to the client computing device 104 and then, over the WAN 120, to the console development kit 108—in order to run the game on the console development kit 108.

Figure 9B:
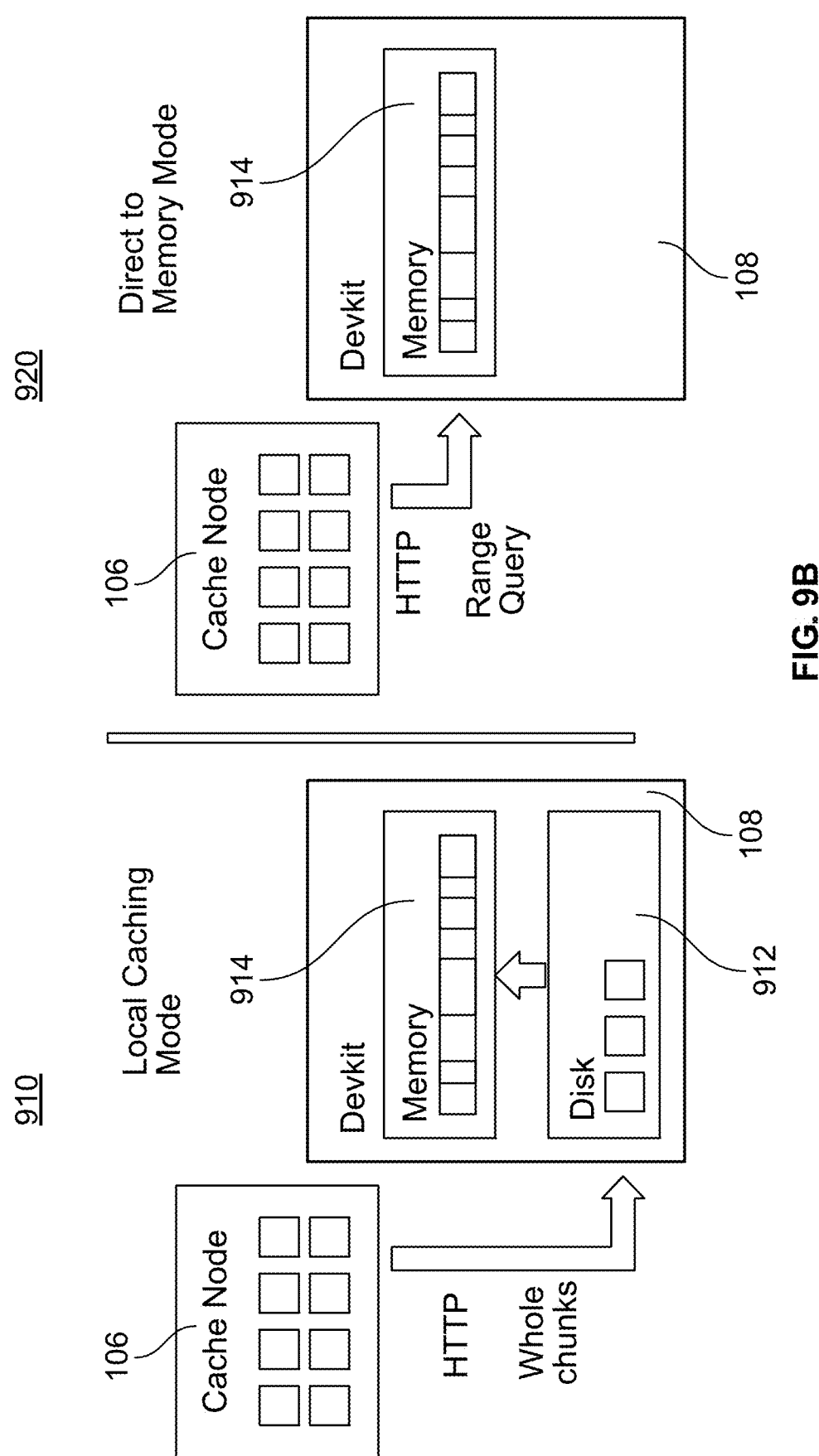
FIG. 9B is a block diagram showing a first mode and a second mode of on-the-fly streaming of one or more game data files from a cache node to a console development kit, in accordance with some embodiments of the present specification.

FIG. 9B shows first and second modes of on-the-fly streaming, over the WAN 120, of one or more game data files from the cache node 106*b* to the console development kit 108, in accordance with some embodiments of the present specification. As shown in a first data flow diagram 910, the first mode of streaming causes the one or more game data files to be first cached in the hard disk 912 of the console development kit 108 before being loaded into its RAM 914. However, as shown in a second data flow diagram 920, the second mode of streaming causes the one or more game data files to be loaded directly into the RAM 914 of the console development kit 108. It should be appreciated that the streaming of the one or more game data files in the second mode happens through a NIC (network integration card) of the console development kit 108 which can be substantially faster than streaming to the hard disk 912 in the first mode.

FIG. 10 is a flowchart of a plurality of exemplary steps of a method 1000 of developing and testing console games, in accordance with some embodiments of the present specification. At step 1002, a first file and one or more second files are cached at a first cache node in response to downloading, by a client-side content management module of a user's client computing device which is configured to do so, the first and second files from at least one of metadata and object storage servers. In some embodiments, the first file is an ELF (Executable and Linking Format) binary file and the one or more second files are game data files.

At step 1004, the user instructs the client-side content management module to download the first file and the one or more second files from the first cache node, wherein the client computing device is configured to be in data communication with the first cache node over a local area network at a first game studio.

At step 1006, the client-side content management module is instructed by the user to upload the first file to a console development kit over a wide area network external to the first game studio, wherein the console development kit is located at a second game studio remote from the first game studio.

At step 1008, the user instructs the client-side content management module to execute the first file on the console development kit. In some embodiments, executing the first file causes a game, corresponding to the first file, to be launched on the console development kit.

At step 1010, the one or more portions of the second file are streamed from a second cache node, at the second game studio, to the console development kit on-the-fly, over a local area network at the second game studio, during execution of the first file. If the one or more portions of the second file are not available cached at the second cache node then the one or more portions of the second file are first downloaded from the object storage server, cached at the second cache node and subsequently streamed to the console development kit. It should be appreciated that in other scenarios a first subset of the one or more portions of the second file may be already available cached at the second cache node while the remaining second subset may need to be downloaded from the object storage server, cached and then streamed to the consoled development kit. In some embodiments, the streamed one or more portions of the one or more second files are cached in a hard disk of the console development kit prior to being loaded in a random access memory of the console development kit. In some embodiments, the streamed one or more portions of the one or more second files are loaded directly in a random access memory of the console development kit.

In some embodiments, the first file includes a plurality of instructions related to a virtual file system which, during execution of the first file, cause the second cache node to stream the one or more portions of the one or more second files to the console development kit or download from the object storage server, cache and then stream to the console development kit.

Preventing DDoS (Distributed Denial-of-Service)

As known to persons of ordinary skill in the art, a distributed denial-of-service (DDoS) refers to disruption of normal traffic to a web property (such as, for example, a web server). In the context of the system 100 of the present specification, if the WAN 120 experiences congestion related issues then the CI module, application or engine of the present specification could potentially choke out other network data traffic or can further aggravate the congestion issue due to a typical stampeding herd problem. This is where many client computing devices 104 fail their requests and immediately retry, causing a stampede of new requests, which can cripple the network and end up in DDoS.

To address this, the present specification applies a randomized exponential backoff algorithm to all requests between the cache nodes 106 and the metadata and object storage servers 115, 110. In some embodiments, the content caching management modules 125d at the cache nodes 106 are configured to implement the randomized exponential backoff algorithm. An exponential backoff algorithm is a form of closed-loop control system that reduces the rate of a controlled process in response to adverse events. Each time an adverse event is encountered, the rate of the process is reduced by some multiplicative factor. A random backoff minimizes the probability that the same nodes will collide again, even if they are using the same backoff algorithm. Increasing the backoff period after each collision also helps to prevent repeated collisions, especially when the network is heavily loaded.

Granular Access Authorization

In some embodiments, each of the client computing devices 104 has service-level authorization to access the metadata server 115. That is, a user does or does not have access to the metadata server 115. In alternate embodiments, at least a portion of the client computing devices 104 has more fine-grained authorization—for example, some users may have read-only access to a server namespace and read/write access to their personal namespaces.

Method for Service Discovery of Cache Nodes 106

In embodiments, a plurality of cache nodes 106 may be associated with the at least one metadata server 115. In some embodiments, in order to address cache node outages and/or maintenance, a user or administrator may prompt a client-side content management module 125c, on his client computing device 104, to generate a user-interface (such as, a CLI or a GUI) and issue instructions/commands to access a cache node 106. Consequently, the client-side content management module 125c first accesses the at least one metadata server 115. This returns a file, for example—a JSON file, giving a list of all cache nodes 106. As part of a QoS (Quality of Service) check, the client-side content management module 125c is configured to automatically implement simultaneous HEAD requests to all the cache nodes 106 and then picks the one with the fastest response time (using either a success or failure indication). In other words, the client-side content management module 125c measures the RTT (round trip time)—that is, the time from when the HEAD request is issued until when a response is received. The HEAD request goes to a '/health' endpoint which just returns a simple "healthy". The RTT is used as an approximation of the best cache node for the user. The assumption is that the cache node with the smallest RTT is probably closest to the user, and the user should use that one. If a cache node is down due to maintenance or issues, the HEAD request will fail thereby automatically disqualifying it for use by a client. However, this involves a lot of work through the client-side content management module 125c. In alternate embodiments, the system 100 implements a solution comprising GeoIP DNS load-balancing resolution ( ). GeoIP DNS attempts to provide a client-side content management module 125c with a cache node that is physically close to the client-side content management module 125c, based on assumptions about IP allocation. (for example, someone in Houston, Texas has IPs in the range of X to Y). If there are multiple cache nodes in say, Texas. then it will be a round robin/random order (of only those cache nodes). In still alternate embodiments, the system 100 implements a dynamic BGP (Border Gateway Protocol). In this solution, every server is provided with the same IP address and the network dynamically routes to the closest cache node 106. In this solution, the client computing devices 104 as well as console development kits 108 are given the same DNS name and it would dynamically resolve to an alive cache node 106 closest to them. In still other embodiments, the dynamic BGP solution provides every server with the same IP address then relies on internet packet routing to route to the closest cache node 106. In still alternate embodiments, the system 100 implements a consul service mesh for service discovery of the cache nodes 106.

Process File Locking

In embodiments, certain commands of the CI module, application or engine of the present specification are protected against other commands. For example, a GC (garbage collection) command cannot be allowed to be executed in the middle of a download or pull process (that is, the method 600*b* of FIG. 6B) by a client computing device 104. The reason being that the GC command would delete all the chunks (according to the method of FIG. 4B) that the client computing device 104 is in the process of downloading or pulling, since the chunks are not referenced yet. A process file lock prevents this from happening by ensuring that only a single command, instruction or process, of a first type, is executed at one time while allowing multiple commands, instructions or processes, of a second type, to be executed simultaneously. For example, the first type includes execution of a GC command during which the process file lock acquires an exclusive lock on all other processes—to ensure that no data or file is being added while the GC command is deleting data or files. The second type, on the other hand, includes multiple download or pull requests from client computing devices 104 (since the devices 104 are not deleting anything during the downloads or pulls).

The above examples are merely illustrative of the many applications of the systems and methods of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A computer-implemented method of performing data cleanup in a game development environment comprising at least one game studio having a plurality of client computing devices and at least one cache node in data communication with each other over a first network that is local to the at least one game studio, wherein the at least one cache node is in data communication with remotely located first and second servers over a second network external to the game studio, wherein the first and second servers, the at least one cache node and each of the plurality of client computing devices are configured to store one or more image files, a plurality of data chunks associated with each of the one or more image files and one or more labels referencing each of the one or more image files, and wherein the first server is configured to execute a first module, the second server is configured to execute a second module, the at least one cache node is configured to execute a third module and each of the plurality of client computing devices is configured to execute a fourth module, the method comprising:

instructing the first, second, third and fourth modules to cause a respective processor in the first server, the second server, the at least cache node and each of the plurality of client computing devices to:

determine at least one first label that has expired;

delete the at least one first label;

determine at least one first image file that is not referenced by any of the remaining one or more labels;

delete the at least one first image file;

determine one or more first data chunks that are not associated with any of the remaining one or more image files; and delete the one or more first data chunks.

2. The computer-implemented method of claim 1, wherein each of the one or more labels has an attribute defining a period of time after which said each of the one or more labels expires, and wherein the attribute is automatically marked as expired at the end of the period of time.

3. The computer-implemented method of claim 1, wherein each of the one or more labels is an alphanumeric data structure comprising a form of:

namespace/name: tag.

4. The computer-implemented method of claim 1, wherein more than one of the one or more labels reference an image file of the one or more image files.

5. The computer-implemented method of claim 1, wherein each of the one or more image files includes a manifest of one or more game files and a plurality of data chunks of each of the one or more game files, wherein each of the one or more game files is referenced by a hash of data indicative of said each of the one or more game files, and wherein each of the plurality of data chunks is referenced by a hash of data indicative of said each of the plurality of data chunks.

6. The computer-implemented method of claim 1, wherein the first server is configured to store the one or more image files and the second server is configured to store the plurality of data chunks.

7. The computer-implemented method of claim 1, wherein the instruction is executed automatically on a predefined periodic basis by the first, second, third and fourth modules.

8. The computer-implemented method of claim 1, wherein determining the one or more first data chunks that are not associated with any of the remaining one or more image files comprises executing a command through a command-line interface generated by a client-side content management module.

9. The computer-implemented method of claim 1, wherein deleting the one or more first data chunks comprises reference counting the one or more first data chunks prior to deletion.

10. The computer-implemented method of claim 1, further comprising querying a database to identify the at least one first image file that is not referenced by any of the remaining one or more labels.

11. The computer-implemented method of claim 1, wherein deleting the one or more first data chunks comprises inserting identifiers of the one or more first data chunks into a delete queue and processing the queue using multiple threads.

12. The computer-implemented method of claim 1, wherein deleting the one or more first data chunks comprises issuing an HTTP DELETE command to an object storage server.

13. The computer-implemented method of claim 1, wherein determining the one or more first data chunks comprises comparing hashes of the one or more first data chunks against hashes stored in a database.

14. The computer-implemented method of claim 1, wherein deleting the at least one first image file comprises automatically deleting an image file that is no longer referenced by any labels.

15. The computer-implemented method of claim 1, wherein each of the plurality of client computing devices is configured to store the one or more image files in an images folder and the plurality of data chunks in an objects folder separate from the images folder.

16. The computer-implemented method of claim 1, wherein each client of the plurality of client computing devices is further configured to store mounts corresponding to each of the one or more image files in a mounts folder, wherein each of the mounts comprises at least one link to a corresponding one of the plurality of data chunks.

17. The computer-implemented method of claim 1, wherein determining the at least one first image file comprises executing a command configured to operate on a metadata server on a predefined periodic basis.

18. The computer-implemented method of claim 1, wherein determining the at least one first label that has expired comprises identifying labels having a time-to-live attribute marked as expired.

19. The computer-implemented method of claim 1, wherein determining the at least one first label that has expired comprises automatically marking a time-to-live attribute as expired when a defined period elapses.

20. The computer-implemented method of claim 1, wherein determining the at least one first label comprises processing a list of labels stored on at least one of the plurality of the client computing devices that references image hashes.

* * * * *